`US008624974B2`

(12) United States Patent
Tsai et al.

(10) Patent No.: US 8,624,974 B2
(45) Date of Patent: Jan. 7, 2014

(54) GENERATING A THREE-DIMENSIONAL MODEL USING A PORTABLE ELECTRONIC DEVICE RECORDING

(71) Applicant: Apple Inc., Cupertino, CA (US)

(72) Inventors: Richard Tsai, Cupertino, CA (US);
Andrew Just, Cupertino, CA (US);
Brandon Harris, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/621,740

(22) Filed: Sep. 17, 2012

(65) Prior Publication Data

US 2013/0038609 A1 Feb. 14, 2013

Related U.S. Application Data

(63) Continuation of application No. 12/361,323, filed on Jan. 28, 2009, now Pat. No. 8,294,766.

(51) Int. Cl.
*H04N 7/18* (2006.01)
*G06T 15/00* (2011.01)

(52) U.S. Cl.
USPC .......................... 348/135; 345/419; 348/148

(58) Field of Classification Search
USPC ........... 345/156, 157, 419; 341/120; 382/107; 715/863; 348/333.02, 135, 148
See application file for complete search history.

(56) References Cited

U.S. PATENT DOCUMENTS

| 6,222,583 | B1 | 4/2001 | Matsumura |
| 6,466,198 | B1 | 10/2002 | Feinstein |
| 7,138,979 | B2 | 11/2006 | Robin |
| 7,379,566 | B2 * | 5/2008 | Hildreth ........................ 382/107 |
| 7,958,135 | B2 | 6/2011 | Katoh |

(Continued)

FOREIGN PATENT DOCUMENTS

| CN | 1963390 | 5/2007 |
| CN | 101118159 | 2/2008 |
| CN | 101124456 | 2/2008 |
| EP | 1650712 | 4/2006 |

OTHER PUBLICATIONS

Bouguet, "Pyramidal Implementation of the Lucas Kanade Feature Tracker Description of the Algorithm." OpenCV Technical Document, 2000, pp. 1-9.
Clipp et al. 'A Mobile 3D City Reconstructions System.' Proc. IEEE VR Workshop on Cityscapes, Dec. 31, 2008, 4 pages.

(Continued)

*Primary Examiner* — Jungwon Chang
(74) *Attorney, Agent, or Firm* — Wong, Cabello, Lutsch, Rutherford & Brucculeri, LLP

(57) ABSTRACT

Systems and methods are provided for navigating a three-dimensional model using deterministic movement of an electronic device. An electronic device can load and provide an initial display of a three dimensional model (e.g., of an environment or of an object). As the user moves the electronic device, motion sensing components can detect the device movement and adjust the displayed portion of the three-dimensional model to reflect the movement of the device. By walking with the device in the user's real environment, a user can virtually navigate a representation of a three-dimensional environment. In some embodiments, a user can record an object or environment using an electronic device, and tag the recorded images or video with movement information describing the movement of the device during the recording. The recorded information can then be processed with the movement information to generate a three-dimensional model of the recorded environment or object.

12 Claims, 15 Drawing Sheets

(56) References Cited

U.S. PATENT DOCUMENTS

| | | | |
|---|---|---|---|
| 8,005,831 B2 | 8/2011 | Hull | |
| 8,174,605 B2* | 5/2012 | Yamada | 348/333.02 |
| 2006/0017692 A1 | 1/2006 | Wehrenberg | |
| 2006/0146009 A1* | 7/2006 | Syrbe et al. | 345/156 |
| 2006/0164382 A1 | 7/2006 | Kulas | |
| 2007/0268392 A1 | 11/2007 | Paalasmaa | |
| 2008/0033641 A1 | 2/2008 | Medalia | |
| 2008/0102785 A1 | 5/2008 | Childress | |
| 2008/0231684 A1 | 9/2008 | Underwood | |
| 2008/0273109 A1 | 11/2008 | Bamford | |
| 2009/0309765 A1* | 12/2009 | Wang et al. | 341/20 |
| 2010/0097494 A1 | 4/2010 | Gum | |
| 2010/0123658 A1* | 5/2010 | Demuynck et al. | 345/157 |
| 2010/0125409 A1 | 5/2010 | Prehofer | |
| 2010/0125816 A1* | 5/2010 | Bezos | 715/863 |
| 2011/0109618 A1 | 5/2011 | Nowak | |
| 2011/0113383 A1 | 5/2011 | Dyack | |

OTHER PUBLICATIONS

Hwang et al. "Camera Based Relative Motion Tracking for Hand-Held Virtual Reality." Proceedings of NICOGRAPH International 2006, Jun. 2006, 6 pages.

Hwang et al. "Hand-Held Virtual Reality: A Feasibility Study." Proceedings of the ACM Symposium on Virtual Reality Software and Technology (VRST '06), Nov. 1-3, 2006, pp. 356-362.

Labrie et al. 'Efficient Camera Motion and 3D Recovery Using an Intertial Sensor.' Fourth Canadian Conference on Computer and Robot Vision, May 1, 2007, pp. 55-62.

Pollefeys et al. "From Images to 3D Models, How Computers Can Automatically Build Realistic 3D Models from 2D Images Acquired With a Handheld Camera." Communications of the ACM, Jul. 2002, vol. 45, No. 7, pp. 51-55.

International Search Report and Written Opinion in PCT Application No. PCT/US2009/069027, dated Jul. 4, 2011.

First Office Action received in CN Application No. 200980158401.7, dated Aug. 14, 2013.

* cited by examiner

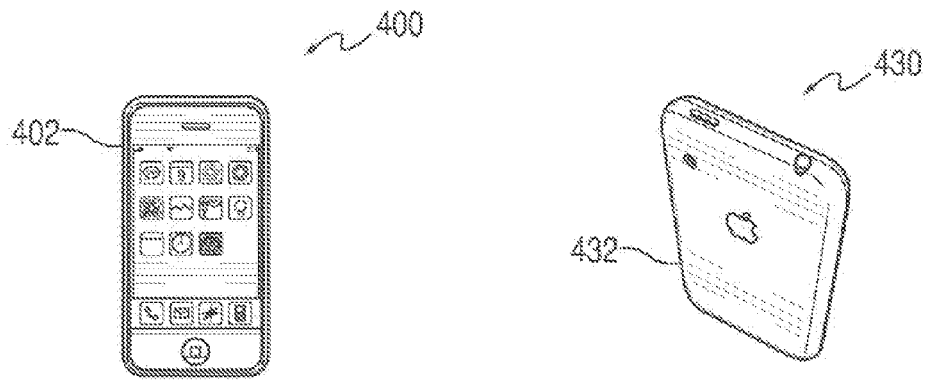
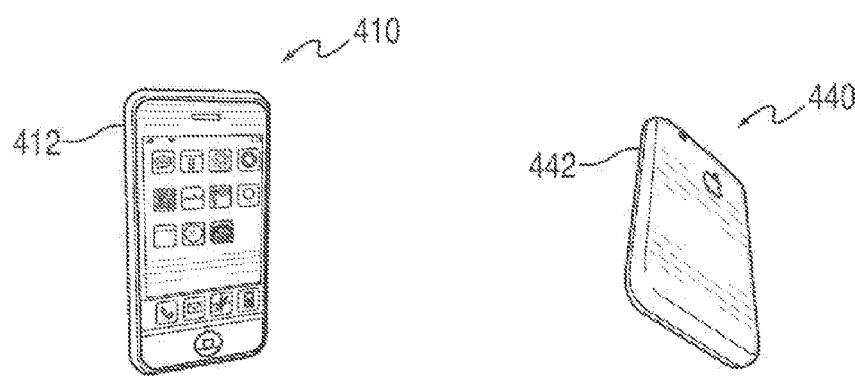
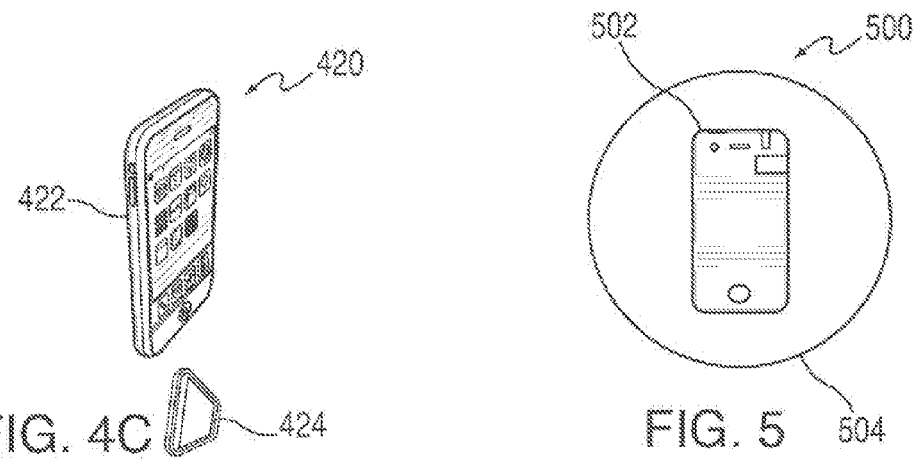
FIG. 4A FIG. 4D
FIG. 4B FIG. 4E
FIG. 4C FIG. 5

GENERATING A THREE-DIMENSIONAL MODEL USING A PORTABLE ELECTRONIC DEVICE RECORDING

BACKGROUND OF THE INVENTION

This is directed to systems and methods for navigating a scene or around an object in three dimensions using deterministic movement of an electronic device. This is also directed to systems and methods for generating a three-dimensional model of a scene or of an object for subsequent three-dimensional navigation by recording the scene using an electronic device.

Users of electronic devices can view various information displayed by the devices. For example, a user can direct an electronic device to display a representation of a three-dimensional object (e.g., a photograph), or allow a user to navigate a representation of a location or of a virtual world (e.g., navigate through a series of images representing a city, such as a series of images in a street view of a mapping application). A user can direct the device to display such information using any suitable approach, including for example by selecting the information from a locally stored or remotely accessed source using an input mechanism. Once selected, the information can be displayed.

Because a planar electronic device display can inherently be only a two-dimensional or planar display, the device can, at any given moment, provide only a partial representation of the displayed information. For example, when a three dimensional object is displayed, the electronic device can only display the object from a single perspective. To view other perspectives, the user may be required to select a different image representing the same object, or provide an input (e.g., selecting a button or dragging a mouse) to cause the object to rotate or spin, providing other perspectives for the object. Similarly, to navigate a representation of a three-dimensional environment, the electronic device can require the user to provide successive inputs using the input mechanism to move through the environment and change the displayed images to reflect the user's movement through the environment. In some cases, however, a user may not be able to provide an input to an input mechanism (e.g., the user's hands are busy). Another mechanism may then be necessary to allow a user to view other portions of a displayed three-dimensional object or three-dimensional environment.

In addition, users typically may not have an easy mechanism for generating three-dimensional representations of three-dimensional objects. Typically, such representations can require taking several images of an object from fixed and known positions and orientations relative the object, and subsequently processing the images to allow users to navigate between images to view all perspectives of the three-dimensional object or event. In particular, the user may be required to provide information related to the relative position and orientation of the lens for each image to allow for subsequent navigation of the images. This can be especially difficult without specialized equipment and prevent most users from generating three-dimensional models of objects or environments.

SUMMARY OF THE INVENTION

This is directed to systems and methods for navigating three-dimensional environments and viewing three-dimensional objects on an electronic device display based on deterministic movement of the electronic device. This is also directed to systems and methods for recording a video of a three-dimensional environment or three-dimensional object, and processing the video to generate a three-dimensional model that can be navigated in an order other than that of the recording.

In some embodiments, a user can direct an electronic device to display information that can be associated with three-dimensional navigation such as, for example, three-dimensional models of environments or objects. For example, a user can direct an electronic device to access a mapping application that provides images of what can be seen in some or any direction from a particular location. As another example, a user can direct an electronic device to display a video game in which a user may navigate a virtual world and see, in any direction, what the virtual world resembles (e.g., rendered images of the virtual world's appearance from any location in the virtual world). As still another example, a user can direct the electronic device to display a three-dimensional object (e.g., an object for sale) that the user can manipulate or view from different angles.

To change the particular display of the environment or object without requiring an input from a dedicated input mechanism, the electronic device can include a motion sensing component (e.g., an accelerometer) operative to detect movements of the electronic device. When the device displays information associated with three-dimensional navigation, the electronic device can monitor the motion-sensing component for device movement and change the displayed information to reflect the output of the motion sensing component. The change in appearance of the three-dimensional environment or object displayed by the device can be correlated to the device movement using any suitable approach, including for example using a linear approximation (e.g., as the user tilts the device, the electronic device displays the environment or object as if the user's perspective of the object was tilted in the same manner as the device). In effect, the electronic device display can provide a window, movable in three dimensions, into the three-dimensional environment, or for viewing the three-dimensional object.

In some embodiments, the user can direct the electronic device to record a three-dimensional environment or object to generate an interactive three-dimensional model. Using a lens of the electronic device, the electronic device can record an environment or object as a user moves the device. The recording can be simultaneously tagged with the output of the motion-sensing component, positioning information, or both to define the spatial relationship between video frames of the recording. The video can then be processed (e.g., on a host device) to generate a three-dimensional model using the images and spatial relationships. Any other electronic device can then load the generated model and allow the user of the other electronic device to navigate the three-dimensional model (e.g., using deterministic movements).

BRIEF DESCRIPTION OF THE DRAWINGS

The above and other features of the present invention, its nature and various advantages will be more apparent upon consideration of the following detailed description, taken in conjunction with the accompanying drawings in which:

FIGS. 4A-4E are a series of schematic views of a three-dimensional object seen from different perspectives as the user moves the device in accordance with one embodiment of the invention;

FIG. 5 is a schematic view of an illustrative three-dimensional object placed in the center of a virtual sphere in accordance with one embodiment of the invention;

DETAILED DESCRIPTION

Figure 1:
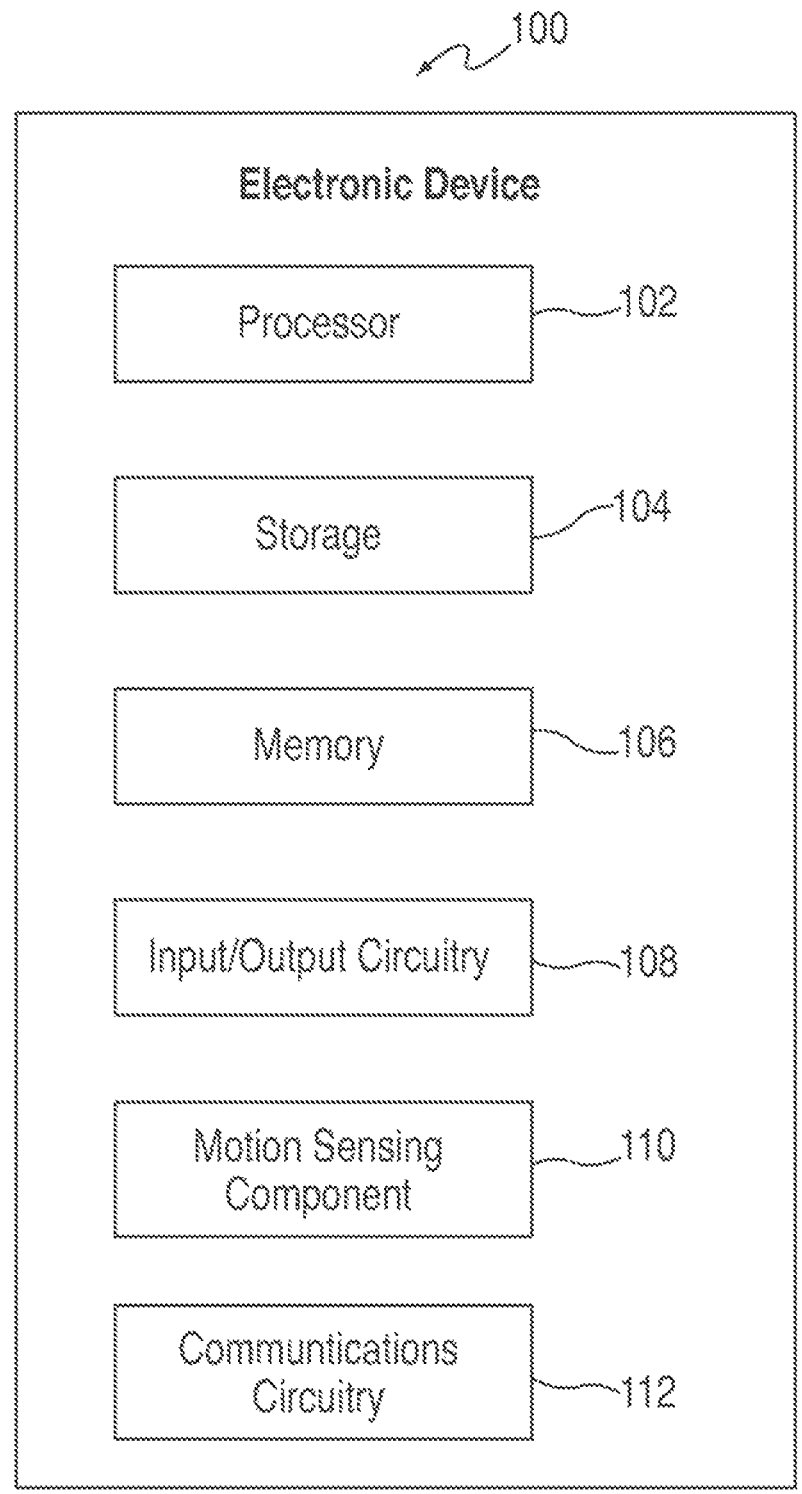
FIG. 1 is a schematic view of an illustrative electronic device for changing the display of information based on device movement in accordance with one embodiment of the invention.

This is directed to systems and methods for navigating three-dimensional information displayed on an electronic device display based on detected movements of the electronic device.

An electronic device can be operative to display different types of information to a user including three-dimensional information, for example in the form of three-dimensional models. For example, an electronic device can display a three-dimensional environment or virtual world that a user can navigate by providing appropriate instructions using an input mechanism (e.g., selecting arrow keys from a keyboard, or selectable directional options displayed on-screen). As another example, an electronic device can display a three-dimensional object that a user can view from multiple or all perspectives (e.g., by changing the user's viewpoint of the three-dimensional object). The user can change the displayed perspective by providing appropriate instructions using an input mechanism.

Requiring a user to provide particular inputs using an input mechanism, however, may not be particularly intuitive and may be burdensome for the user. As an alternative, or in addition to changing the display of three-dimensional information in response to input mechanism inputs, a user can direct an electronic device to change the display of the information using deterministic movements of the device. To defect the device movement, the electronic device can include a motion-sensing component or other suitable movement detection component operative to monitor and quantify movements of the device. For example, the electronic device can include one or more accelerometers, gyroscopes, or any other component operative to detect motion. Based on the motion-sensing component output, the electronic device can determine the amount and direction by which to change the display of the three-dimensional information. The electronic device can use some or all of the motion-sensing component output in determining how to change the displayed information, including for example using motion information perpendicular to the plane of the display to walk or move through a three-dimensional environment. In some embodiments, the electronic device can instead or in addition use positioning circuitry operative to identify the current location of the electronic device to change the displayed three-dimensional information (e.g., walk through a virtual three-dimensional world as the user walks with the device in the real world).

The manner in which the displayed information changes in response to an electronic device movement can be defined using any suitable approach. In some embodiments, the electronic device can define vectors describing the device movement, and change the displayed information in a manner related to the defined vector. In effect, the information displayed by the device can change in a manner to emulate a movable window showing portions of the three-dimensional information as it is moved around the information (e.g., a movable window in a three-dimensional environment). The amount by which information changes can be related to dimensions associated with the three-dimensional information, fixed distances on the electronic device display, or any other suitable relation. In some embodiments, the amount can change for different dimensions (e.g., a smaller movement corresponds to a larger change in the image in the direction perpendicular to the plane of the display). To ease the burden of following the changing display, the electronic, device can apply a hysteresis to the display transition.

In some embodiments, the electronic device can combine input mechanism inputs with electronic device movement to navigate displayed, three-dimensional models. For example, the electronic device can enable a zoom instruction in addition to deterministic movement instructions. In some embodiments, the electronic device can enable a combination of input mechanism inputs and device movements to perform non-navigation (e.g., zoom) or enhanced navigation (e.g., jumping to alternate viewing points) operations. For example, the electronic device can enable device movements combined with specific inputs (e.g., moving the device while touching a touch screen).

In some embodiments, the electronic device can be used to generate three-dimensional models of objects or environments. Using a lens or camera, the electronic device can record a video of an object or an environment. Using the motion-sensing component, the electronic device can determine the path or movement of the electronic device as it records the video, and associate movement information with the video frames of the recording. Using the movement information, the electronic device (or a host device to which the electronic device is coupled) can generate a three-dimensional model of the recorded environment or object in which the individual video frames are associated with absolute location coordinates or information in the model (i.e., instead of coordinate information derived from the path of the device starting at an undetermined initial location). Using the model, a user can then navigate a three-dimensional representation of the recorded environment or object without being required to view the environment or object in the order of the recording.

FIG. 1 is a schematic view of an illustrative electronic device for changing the display of information based on device movements in accordance with one embodiment of the invention. Electronic device 100 can include any suitable type of electronic device operative to display information to a user while detecting movement of the device. For example, electronic device 100 can include a media player such as an iPod® available by Apple Inc., of Cupertino, Calif., a cellular telephone, a personal e-mail or messaging device (e.g., a Blackberry® or a Sidekick®), an iPhone® available from Apple Inc., pocket-sized personal computers, personal digital assistants (PDAs), a laptop computer, a music recorder, a video recorder, a gaming device, a camera, radios, medical equipment, and any other portable electronic device capable of being moved by the user.

Electronic device 100 can include a processor or control circuitry 102, storage 104, memory 106 input/output circuitry 108, and communications circuitry 112, as typically found in an electronic device of the type of electronic device 100, and operative to enable any of the uses expected from an electronic device of the type of electronic device 100 (e.g., connect to a host device for power or data transfers). In some embodiments, one or more of electronic device components 100 can be combined or omitted (e.g., combine storage 104 and memory 106), electronic device 100 can include other components not combined or included in those shown in FIG. 1 (e.g., positioning circuitry), or electronic device 100 can include several instances of the components shown in FIG. 1. For the sake of simplicity, only one of each of the components is shown in FIG. 1.

Motion-sensing component 110 can be operative to detect movements of electronic device 100. In some embodiments, a motion-sensing component can include one or more three-axes acceleration motion-sensing components (e.g., an accelerometer) operative to detect linear acceleration in three directions (i.e., the x or left/right direction, the y or up/down direction, and the z or out of the plane of the electronic device display). As another example, a motion-sensing component can include one or more two-axis acceleration motion-sensing components which can be operative to detect linear acceleration only along each of x or left/right and y or up/down directions (or any other pair of directions). In some embodiments, a motion-sensing component can include an electrostatic capacitance (capacitance-coupling) accelerometer that is based on silicon micro-machined MEMS (Micro Electro Mechanical Systems) technology, a piezoelectric type accelerometer, a piezoresistance type accelerometer, or any other suitable accelerometer.

In some embodiments, the motion-sensing component can indirectly detect rotation, rotational movement, angular displacement, tilt, position, orientation, motion along a non-linear (e.g., arcuate) path, or any other non-linear motions. For example, if the motion-sensing component is a linear motion-sensing component, additional processing can be used to indirectly detect some or all of the non-linear motions. For example, by comparing the linear output of the motion-sensing component with a gravity vector (i.e., a static acceleration), the motion-sensing component can calculate the tilt of electronic device 100 with respect to the y-axis. In some embodiments, the motion-sensing component can instead or in addition include one or more gyro-motion-sensing components or gyroscopes for directly detecting rotational movement. For example, motion-sensing component 110 can include a rotating or vibrating element. As another example, motion-sensing component 110 can include a magnometer operative to detect the orientation of the device relative a magnetic north pole. The electronic device can monitor changes in the output of the magnometer to detect rotations of the device.

In some embodiments, electronic device 100 can include positioning circuitry for determining the current position of electronic device 100, and can be operative to update the current position at any suitable rate, including at relatively high rates to provide an estimation of speed and distance traveled. In some embodiments, the positioning circuitry can include a global positioning system ("GPS") receiver for accessing a GPS application function call that returns the geographic coordinates (i.e., the geographic location) of the device. The geographic coordinates can be fundamentally, alternatively, or additionally derived from any suitable trilateration or triangulation technique. For example, the device can determine its location using various measurements (e.g., signal-to-noise ratio ("SNR") or signal strength) of a network signal (e.g., a cellular telephone network signal) associated with the device. For example, a radio frequency ("RF") triangulation detector or sensor integrated with or connected to the electronic device can determine the approximate location of the device. The device's approximate location can be determined based on various measurements of the device's own network signal, such as (1) the angle of the signal's approach to or from one or more cellular towers, (2) the amount of time for the signal to reach one or more cellular towers or the user's device, (3) the strength of the signal when it reaches one or more towers or the user's device, or any combination of the aforementioned measurements, for example. Other forms of wireless-assisted GPS (sometimes referred to herein as enhanced GPS or A-GPS) can also be used to determine the current position of electronic device 100. Instead or in addition, the positioning circuitry of the device can the location of the device based on a wireless network or access point that is in range or a wireless network or access point to which the device is currently connected. For example, because wireless networks have a finite range, a network that is in range of the device can indicate that the device is located in the approximate geographic location of the wireless network. In some embodiments, the device can automatically connect to a wireless network that is in range in order to receive the valid modes of operation for that location.

In some embodiments, electronic device 100 can instead or in addition include a camera or lens operative to record images or video of the device environment. For example, the electronic device can include an optical or digital lens for capturing light reflected from the user's environment. The captured light can be recorded as individual distinct images, or as consecutive video frames of a recording (e.g., several video frames constituting a primary frame and subsequent frames indicating the difference between the primary frame and the subsequent frames). The control circuitry may associate different metadata with the recorded images, including for example positioning information, device movement information, a time code, a device identifier, or any other suitable metadata.

Figure 2A:
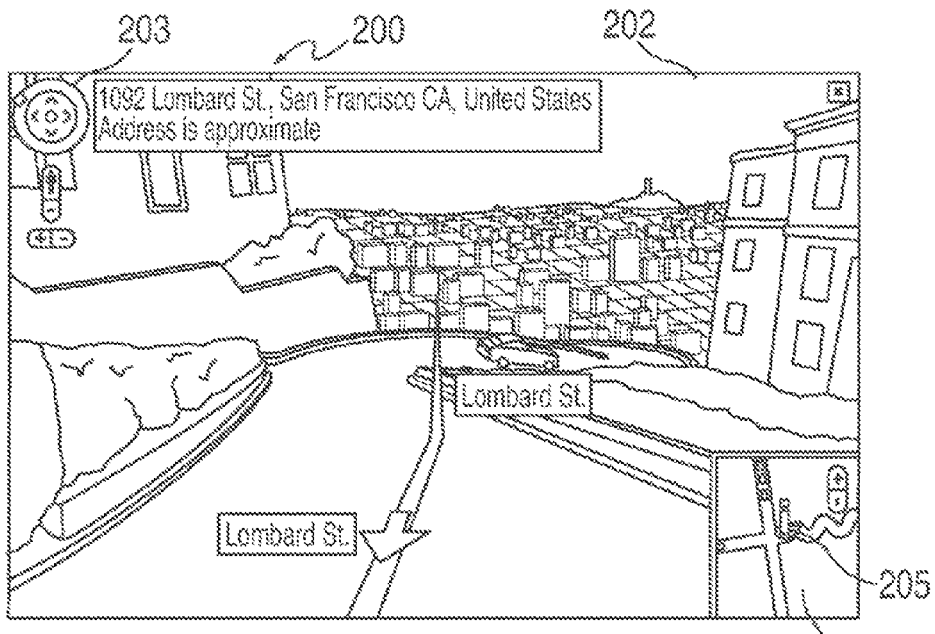
FIGS. 2A-2E are schematic views of a display of a three-dimensional environment as a user moves an electronic device while staying in place in accordance with one embodiment of the invention.
Figure 2B:
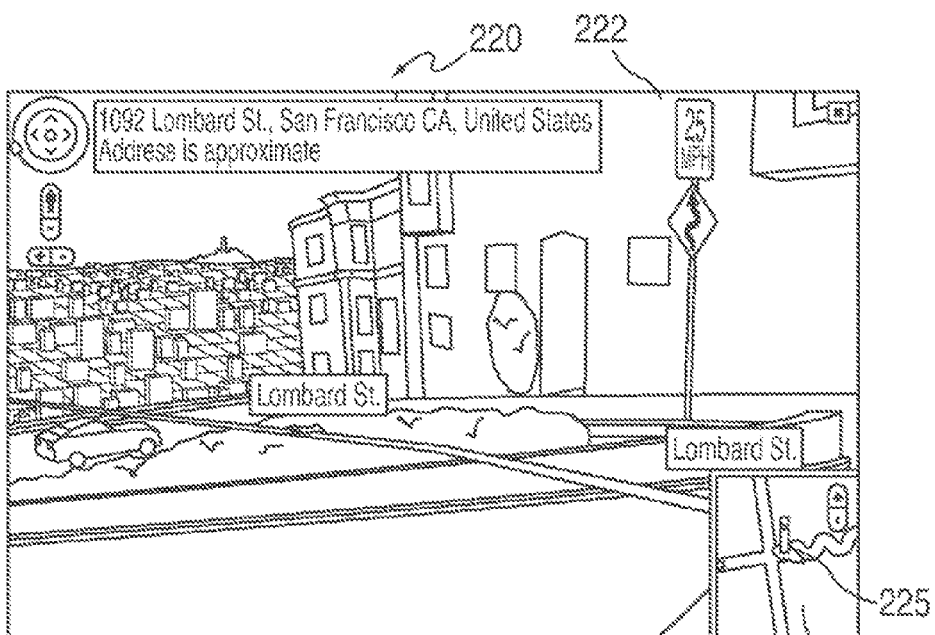

Using the electronic device, a user can view three-dimensional representations of environments or objects. The three-dimensional representations can be provided to the device as models with surfaces to render and display based on the user's position and orientation around or within the model. When the electronic device loads a three-dimensional model, the electronic device can enable a three-dimensional navigation mode (e.g., automatically or in response to a specific input using the input mechanism or detected by the motion-sensing component). The electronic device can indicate to a user that the movement based navigation mode has been enabled using any suitable approach, including for example using one or more of an audio indication and a visual indication. FIGS. 2A-2B are schematic views of a display of a three-dimensional environment as a user moves or tilts an electronic device while staying in place in accordance with one embodiment of the invention. As shown in FIG. 2A, display 200 can include representation 202 of a three-dimensional environment and map overlay 204 providing context for the displayed representation. Map overlay 204 can be displayed using any suitable approach, including for example as an overlay, in a distinct section of the display (e.g., a picture-in-picture window), or in a separate window (e.g., in response to a user instruction to view the map). Map overlay 204 can be displayed at any suitable time, including automatically in response to displaying representation 202, in response to a user instruction (e.g., a user toggling a setting), for a predetermined delay, when representation 203 changes by a particular amount (e.g., the user's orientation changes by more than 30 degrees within a 2 second period) or any other suitable time.

To assist a user in orienting himself in the three-dimensional environment, map overlay 204 can include depiction 205 of an individual oriented to view representation 202. Depiction 205 can include any suitable representation operative to provide orientation context, such as a representation of a human body combined with an arrow. In the example of FIGS. 2A-2E, depiction 205 provides an indication in the plane of the environment terrain (e.g., in the plane of the street) of the user's orientation (but no indication as to the tilt of the user relative to the plane). In some embodiments, representation 202 can instead or in addition include compass 203 or another orientation mechanism for providing an indication of orientation to the user. Compass 203 can be displayed in any suitable manner and at any suitable time, including for example any of the manners or times described in connection with map overlay 304. In some embodiments, compass 203 can provide an indication of tilt.

Device 210 and coordinate system 212 can represent the orientation of display 210 relative fixed coordinate system 212 (e.g., in the user's real environment) when the electronic device displays representation 202. In some embodiments, coordinate system 212 can be displayed instead of or in addition to map overlay 204 (e.g., to provide a three-dimensional frame of reference for the user). As shown in FIG. 2A, display 210 is perpendicular to the plane of the street (e.g., an x-y plane) and aligned with a particular coordinate axis (e.g., a z-axis extending from the surface of the display). To view other portions of the three-dimensional environment (e.g., when a three-dimensional model has been loaded, or when three-dimensional movement-based navigation has been enabled), the user can move the device display. FIG. 2B is a schematic view of the three-dimensional environment of FIG. 2A when the user rotates the device (e.g., to the right). Display 220 can include representation 222 with map overlay 224, which can include some or all of the features of representation 203 and overlay 204. As shown by comparing the relative orientations of depiction 225 and depiction 205, the user in display 220 has turned to the right. The corresponding portion of the three-dimensional environment displayed in representation 222 therefore can change to reflect the new orientation. In addition, the representation of device 230 can be stretched to indicate the rotation, relative initial device 210 (also shown in the change the orientation of coordinates 232)

Figure 2C:
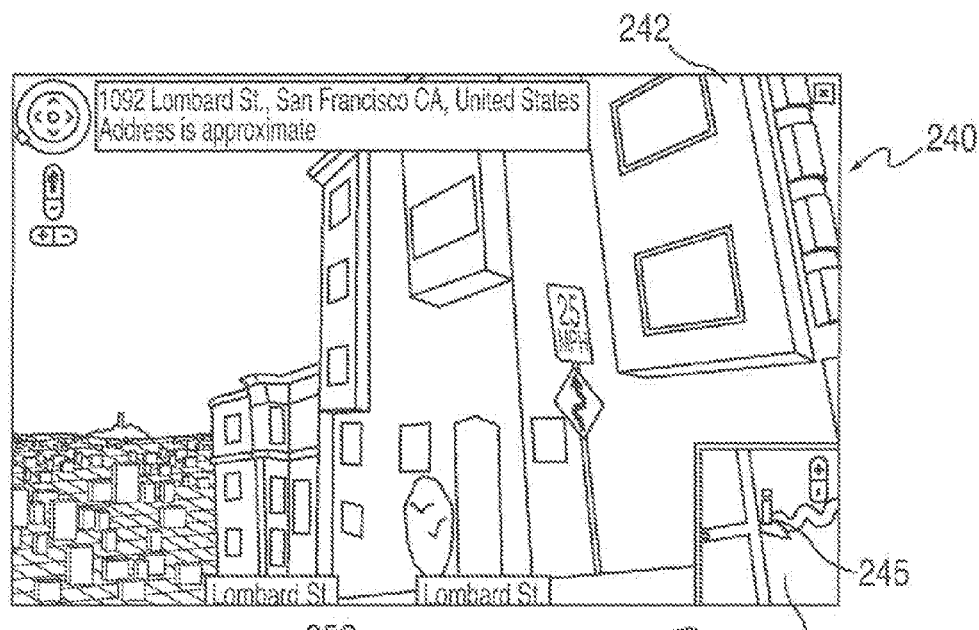

In some embodiments, the user can instead tilt the electronic device display relative to the plane of the user's environment (e.g., the x-y plane). FIG. 2C is a schematic view of the three-dimensional environment of FIG. 2B when the user tilts the device (e.g., tilts the device up). Display 240 can include representation 242 with map overlay 244, which can include some or all of the features of representation 202 and overlay 204. Because the user may have tilted the display, the representation of device 250 can be rotated in addition to stretched to indicate the tilt relative device 230 (also shown in the change in the orientation of coordinates 252 relative to the orientation of coordinates 232). The change in tilt, however, may not be detectable by comparing the relative orientations of depiction 225 and depiction 245 within the respective map overlays, as the user's orientation in the plane of the user's environment (e.g., and on the map) may not have changed.

Figure 2D:
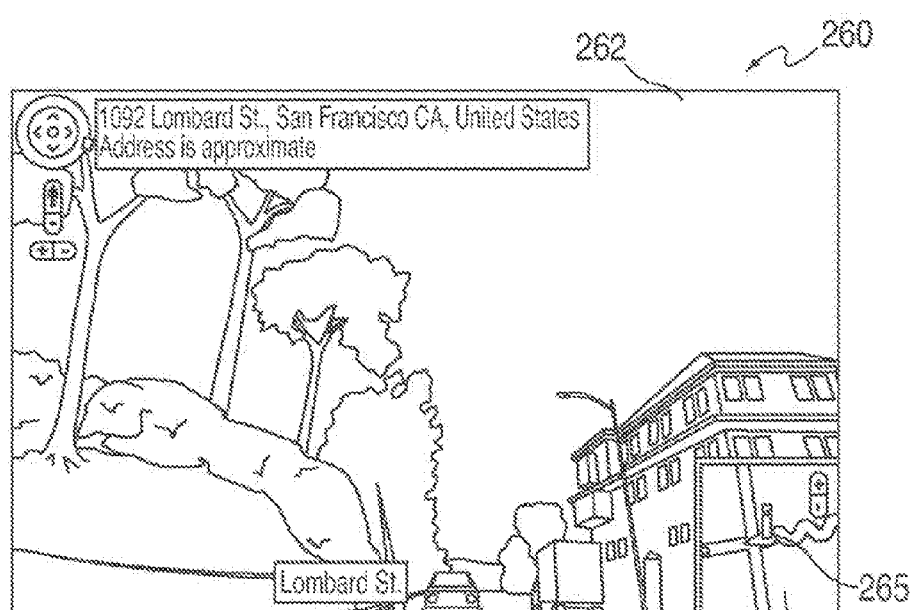

The user can turn with a tilted display to view different portions of the environment from the same angle. FIG. 2D is a schematic view of the three-dimensional environment of FIG. 2C when the user rotates the device further. Display 260 can include representation 262 with map overlay 264, which can include some or all of the features of representation 202 and overlay 204. The angle of the display relative the plane of the environment (e.g., the x-y plane) can remain the same, as shown by the change in the orientation of coordinates 272 relative to the orientation of coordinates 252. The orientation of depiction 265, however, can change relative to depiction 245 to indicate the new orientation along the x-y plane of the user. In addition, the representation of device 270 can be tilted by the same angle as the representation of device 250, but stretched in a different manner to indicate the rotation without any change in tilt.

Figure 2E:
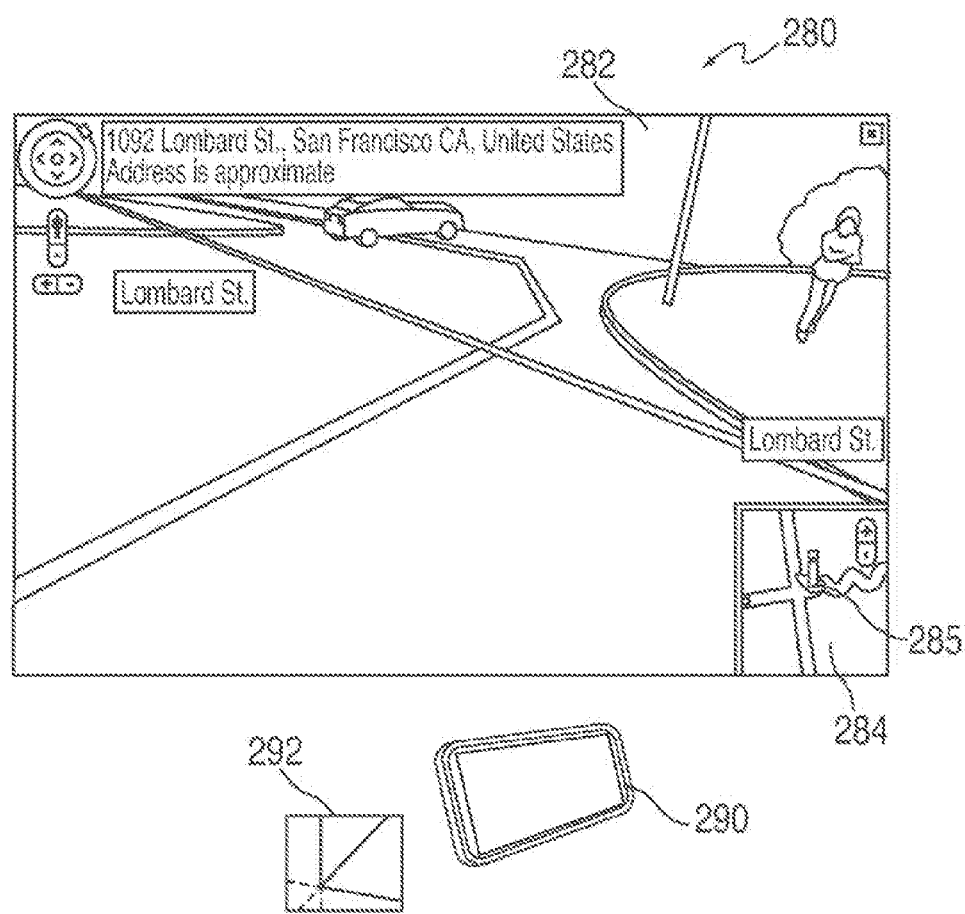

The user can tilt or rotate the electronic device by any suitable amount. In some embodiments, the amount by which the device can be tilted or rotated can be limited or constrained by the three-dimensional model that is navigated. For example, the model may include one or both of upper and lower tilt limits. When the user tilts a device past a tilt limit, the electronic device can ignore subsequent tilting and continue to display the representation associated with the tilt limit. In some embodiments, the electronic device can provide an indication (e.g., audio or visual) that a tilt limit has been reached. Alternatively, the user can tilt the device by any amount. FIG. 2E is a schematic view of the three-dimensional model of FIG. 2A when the user tilts and rotates the device simultaneously. In the example of FIG. 2E, the user can tilt the device down and rotate the device to the left. Display 280 can include representation 282 with map overlay 284, which can include some or all of the features of representation 202 and overlay 204. The representation of device 290 can be both rotated and stretched relative to the representation of device 210 to indicate that the device has been tilted and rotated simultaneously. In addition, the tilt and rotation of the device can be detected by the respective orientations of depiction 285 in map overlay 284 and coordinates 292.

Figure 3A:
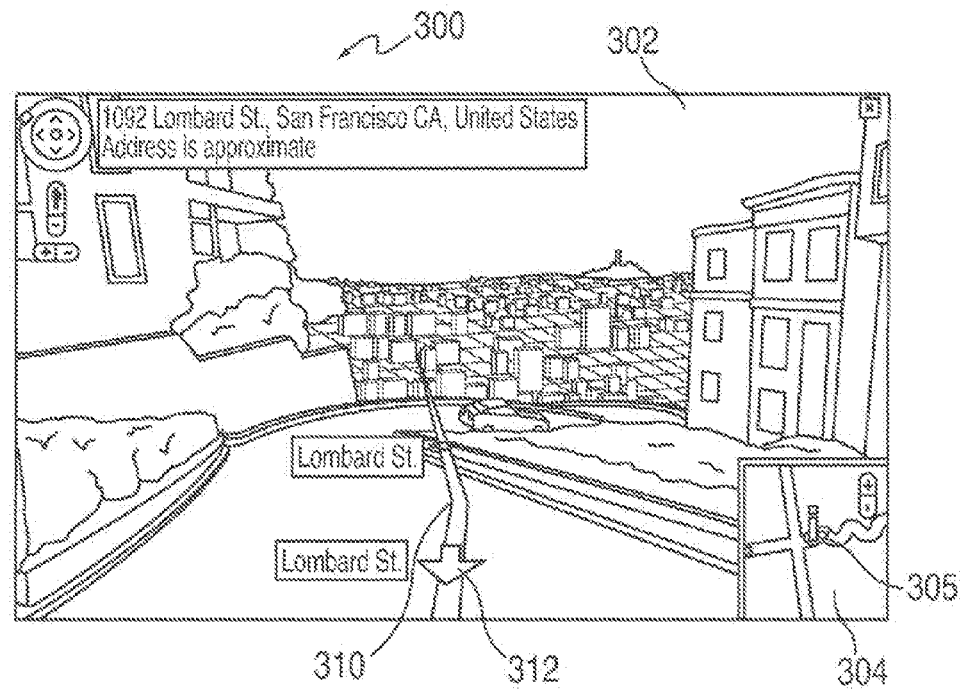
FIGS. 3A-3D are schematic views of a three-dimensional environment as the user moves through the environment in accordance with one embodiment of the invention.

In addition to viewing different portions of a three-dimensional model from a fixed position by changing the orientation of the electronic device display within the user's real environment (e.g., relative to a fixed real environment coordinate system), the electronic device can in addition allow a user to navigate within the model using deterministic movement. In particular, the motion-sensing component, positioning circuitry, or both can be used to detect the position of the device as the user moves within the user's environment. For example, the electronic device can detect that a user is walking in a particular direction and at a particular pace in the user's real environment, and change the portions of the three-dimensional model that are displayed to emulate virtually walking through the model in a direction and at a pace related to the user's direction and pace in the user's real environment. FIGS. 3A-3D are schematic views of a three-dimensional environment as the user moves through the environment in accordance with one embodiment of the invention. FIG. 3A is a schematic view of a three-dimensional representation of an environment in accordance with one embodiment of the invention. Display 300 can include representation 302 of the environment, which can be rendered to represent the user's perspective of the environment from a predetermined location. Map overlay 304 can provide an indication of the user's position or location in the virtual three-dimensional environment, and representation 305 within map overlay 304 can indicate the user's exact position and orientation on map overlay 304. Map overlay 304 can instead or in addition include some or all of the features of map overlay 284 (FIG. 2A).

In some embodiments, representation 302 can include an indication of available paths that a user can follow within the three-dimensional environment to navigate the model. For example, representation 302 can include path 310 overlaid on a portion of the model image. Path 310 can follow existing paths within the environment (e.g., roads), arbitrary courses within the environment (e.g., through a field or within a building), or both. Several paths 310 can intersect to identify alternative routes that a user can follow (e.g., a path into a house or building for which a three-dimensional model is available). If a user can navigate within the entirety of displayed representation 302, representation 302 can include path 310 overlaid over the entirety of the display, or instead can not overlay path 310.

Path 310 can include directional icons 312 indicating available directions at which a user can travel along the path. For example, icons 312 can be displayed to identify areas off of path 310 for which the three-dimensional representations are available (e.g., buildings into which a user can enter). As another example, icons 312 can identify alternate paths that a user may follow (e.g., paths at an intersection, or a path going up stairs or into an elevator in a building). To move along path 310, or alternatively navigate within the displayed environment, a user can select directional icons 312 using an input mechanism. Alternatively, the user can move the electronic device in the direction of an icon 312 on path 310 (e.g., move the device within the plane of the user's real environment, or move the device to the bottom of stairs and tilt up to select a path up stairs). For example, a user can walk, while holding the electronic device, in the direction of path 310. If the user provides an indication to follow a path on a different level (e.g., up stairs), the electronic device may allow the user to access the different level while remaining, in the real environment, on a single level (e.g., virtually visit a multi-story house while remaining on a single floor in the real environment).

Figure 3B:
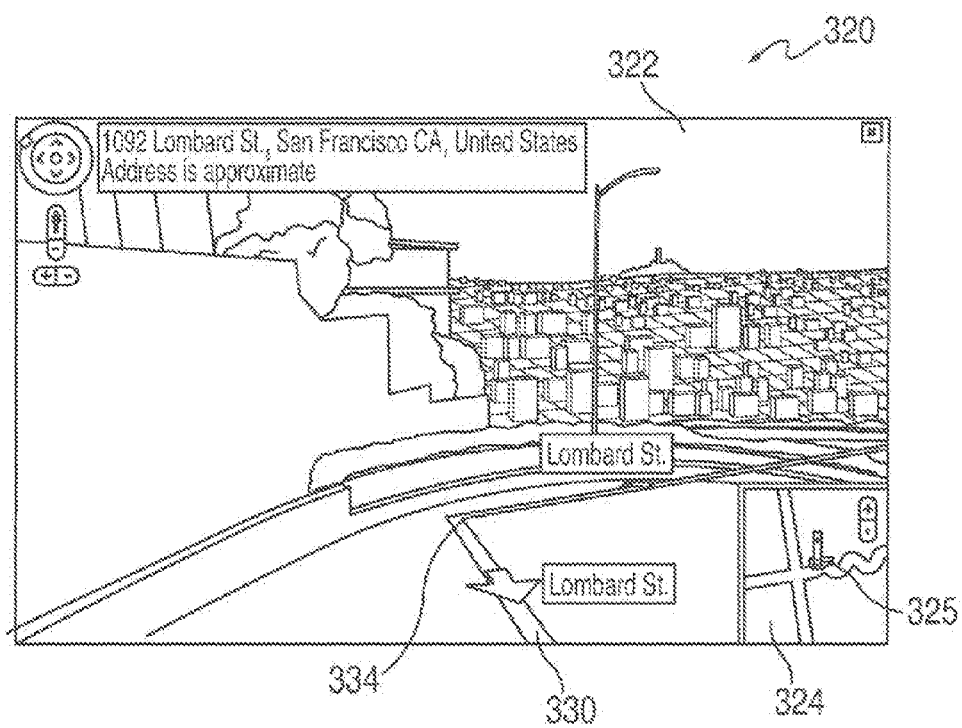

As the motion-sensing component, positioning circuitry, or other electronic device component detects that the user is moving along path 310, the electronic device can change representation 302 to reflect the user's new position within the three-dimensional model. FIG. 3B is a schematic view of the three-dimensional environment of FIG. 3A as the user moves the electronic device in accordance with one embodiment of the environment. Display 320 can include representation 322 and map overlay 324, which can include some or all of the features of representation 302 and map overlay 304. To indicate to the user that the displayed perspective has changed, depiction 325 can be at a different location on map overlay 324 than depiction 305 on map overlay 304. In particular, the relative positions of depictions 305 and 325 can reflect the user's movement along path 310 in the virtual environment and the device movement in the plane of the environment (e.g., as the user walked) in the real environment.

Representation 322 can include path 330, which can include some or all of the features of path 310. Path 330 can include bend 334, which can require a user to change the direction in which to move the device to continue to navigate the virtual environment. In particular, as a user reaches bend 334, the electronic device can ignore further movement in the initial direction of path 330, and instead require the user, in the real environment, to turn and move the electronic device in the subsequent direction of path 330 (e.g., turn and walk to the right) to continue to navigate the virtual environment. If a user, in the real environment, cannot turn in the direction required by path 330 (e.g., the user is against a wall on the right), the user can temporarily disengage the deterministic movement navigation mode to re-orient the device in a manner that allows the user to follow path 330 in the virtual environment. For example, a user reaching bend 334 can temporarily suspend the deterministic movement navigation mode and turn away from the wall (e.g., to the left), then re-engage the deterministic movement navigation mode and turn to the right (e.g., again parallel to the wall) to continue to follow path 330. Alternatively, the user can provide an input using an input mechanism to pass bend 334 and continue, in the initial direction in the real environment, along the subsequent section of path 330.

Figure 3C:
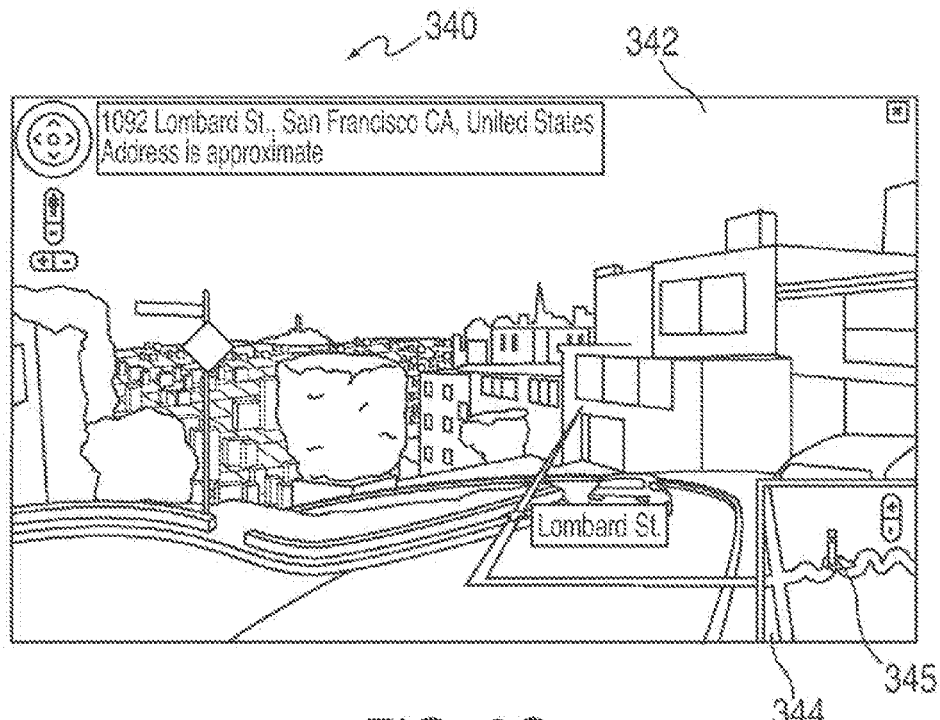

FIG. 3C is a schematic view of the three-dimensional environment of FIG. 3B after the user has passed the bend in the path in accordance with one embodiment of the invention. Display 340 can include representation 342 and map overlay 344, which can include some or all of the features of representation 302 and map overlay 304. The orientation and position of depiction 345, placed on map overlay 344, can identify the user's position and orientation in the virtual environment, and indicate the user's progress along the path relative to depictions 305 and 325).

Figure 3D:
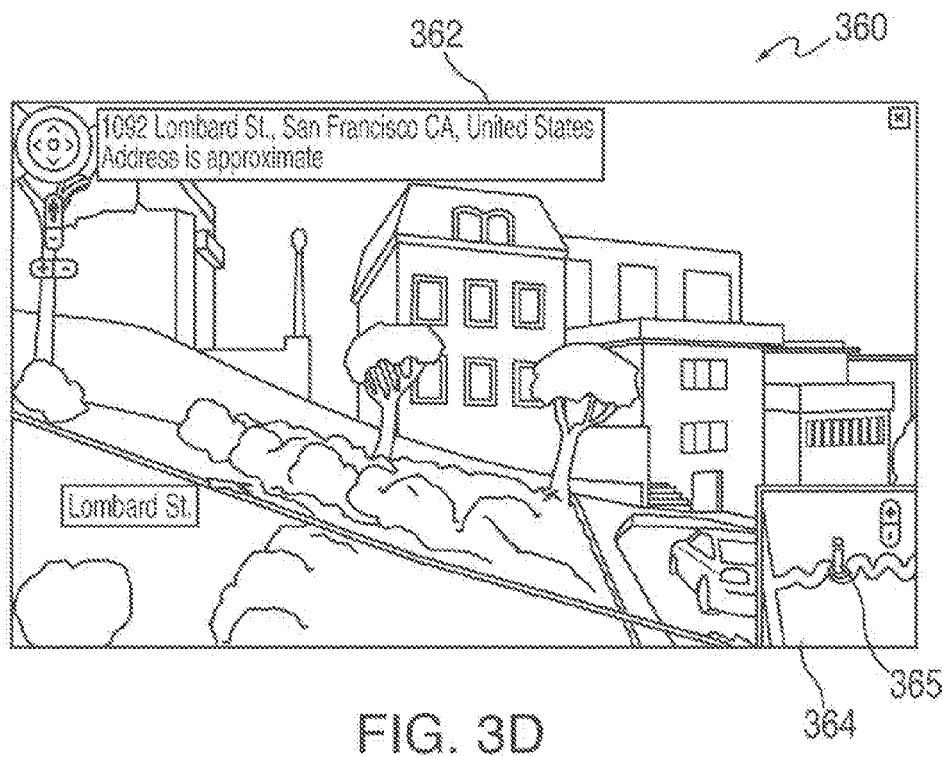

In addition to navigating the three-dimensional model, the user can change the orientation of the electronic device to view different perspectives from a same location, or as a user navigates within the model. FIG. 3D is a schematic view of the three-dimensional environment of FIG. 3C when the user rotates and tilts the electronic device in accordance with one embodiment of the invention. Display 360 can include representation 362 and overlay 364, which can include some or all of the features of representation 302 and map overlay 304. The orientation of depiction 365 on map overlay 364 can indicate the manner in which a user has rotated the electronic device relative the path followed by the user. The tilt of the device relative to the plane of the environment (e.g., representation 362 represents a device that has been tilted up) can be indicated using any suitable overlay or information displayed by the device, or alternatively can be deduced from the representation (e.g., the angle of buildings displayed on the device).

In some embodiments, a user can instead or in addition navigate a three-dimensional model of an object. FIGS. 4A-4E are a series of schematic views of a three-dimensional object seen from different perspectives as the user moves the device in accordance with one embodiment of the invention. Displays 400, 410, 420, 430 and 440 can each include representations 402, 412, 422, 432 and 442, respectively, showing different perspectives of a three-dimensional model. The particular orientation at which the electronic device is held can be indicated by the perspective view of devices 404, 414, 424, 434 and 444, respectively. As the user moves the electronic device, the perspective of the three-dimensional model shown can change to reflect the orientation of the device relative to the model.

The electronic device can correlate electronic device movements with the three-dimensional model display using any suitable approach. In some embodiments, the electronic device can associate the model with a fixed position in the user's real environment. As the user moves the device around the fixed position, the portion of the three-dimensional model displayed by the device can change to reflect the perspective of the device relative to the fixed position. For example, a three-dimensional model can be associated with the center of a virtual sphere in the user's real environment, such that the displayed perspective of the model reflects the perspective of the device from its position on the surface of the sphere. FIG. 5 is a schematic view of an illustrative three-dimensional object placed in the center of a virtual sphere in accordance with one embodiment of the invention. Representation 500 can include model 502 placed at the center of virtual sphere 504. As the user moves the electronic device around the surface of sphere 504, the displayed perspective of model 502 can reflect the current position of the device on the surface of sphere 504. In some embodiments, each model can be associated with several concentric spheres, each having different diameters. As the user moves the device relative to the center of the spheres, the device can detect that the user has changed spheres (e.g., the distance between the center of the sphere and the device can change as the user moves the device) and display the model with different seems (e.g., zoom in as the device moves closer to the center of the spheres).

In some embodiments, the electronic device can display a three-dimensional model that includes both an environment to navigate and objects around which a user can move to see different perspectives of the object. FIGS. 6A-6H are schematic views of an illustrative three-dimensional model, in accordance with one embodiment of the invention. Displays 600, 610 and 620 show perspective views of a model as a user changes perspectives around the model. Displays 630, 640, 650 and 660 show perspective views as the user moves the electronic device within the model (e.g., to see underneath the arches of the Brooklyn Bridge). The user can navigate the three-dimensional model by moving the electronic device in the portions of the user's real environment that are associated with the model. The electronic device can provide any suitable mechanism for efficiently changing the user's perspective from a global view of the entire model (e.g., FIGS. 6A-6C) to a more detailed view of a portion of the model (FIGS. 6D-6H).

Figure 6A:
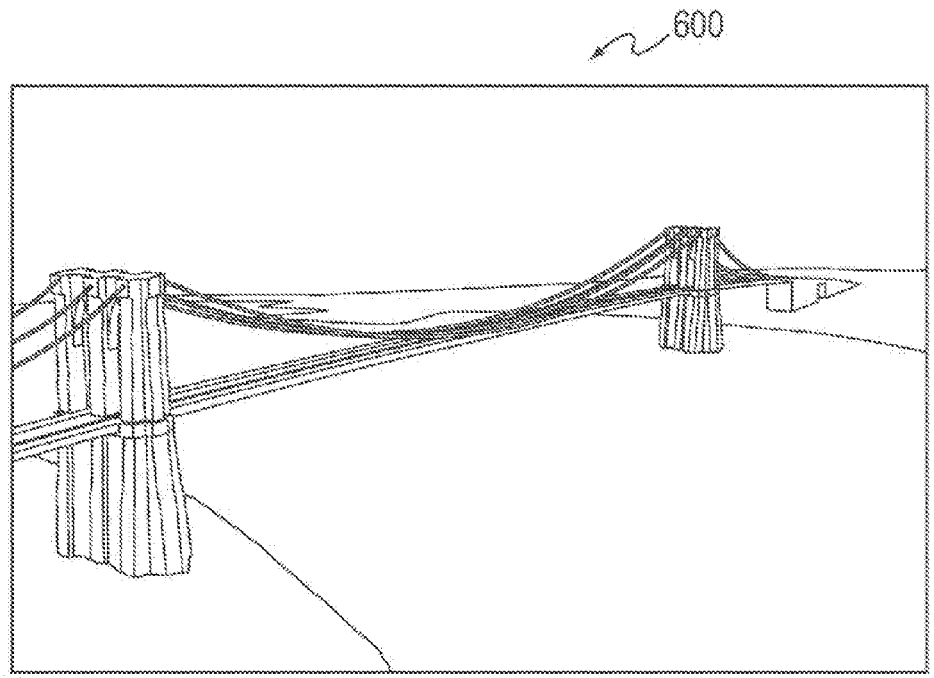
FIGS. 6A-6H are schematic views of an illustrative three-dimensional model in accordance with one embodiment of the invention.
Figure 6B:
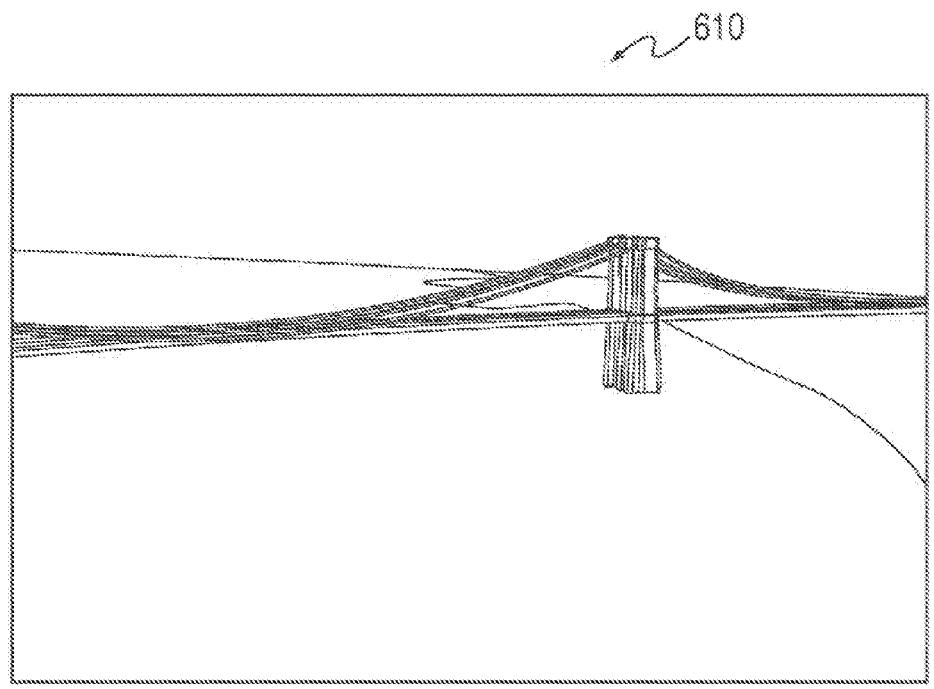
Figure 6C:
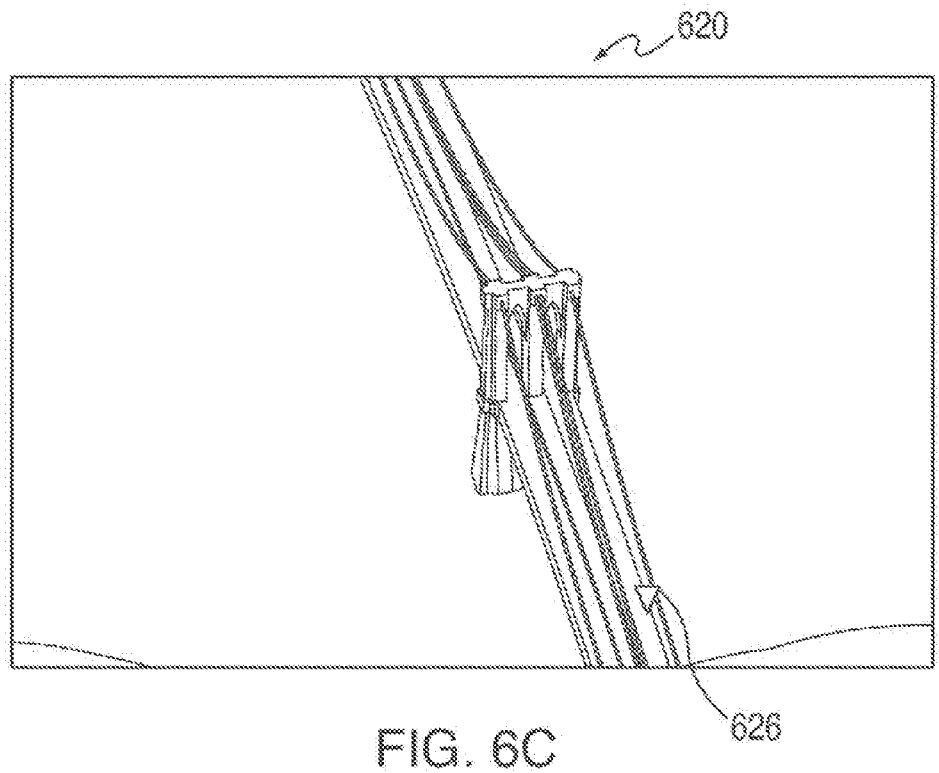
Figure 6D:
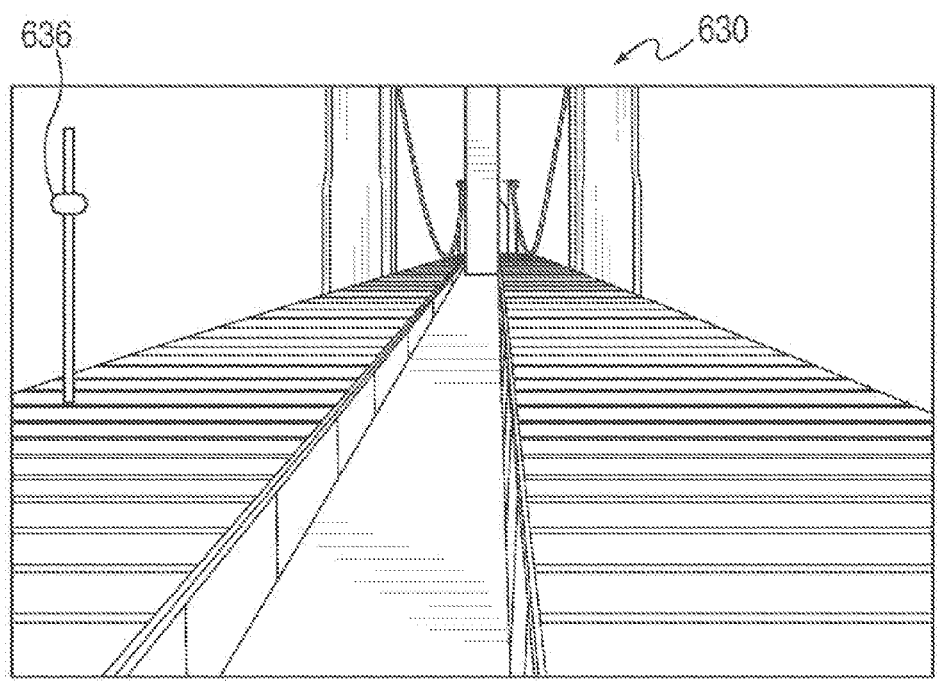
Figure 6E:
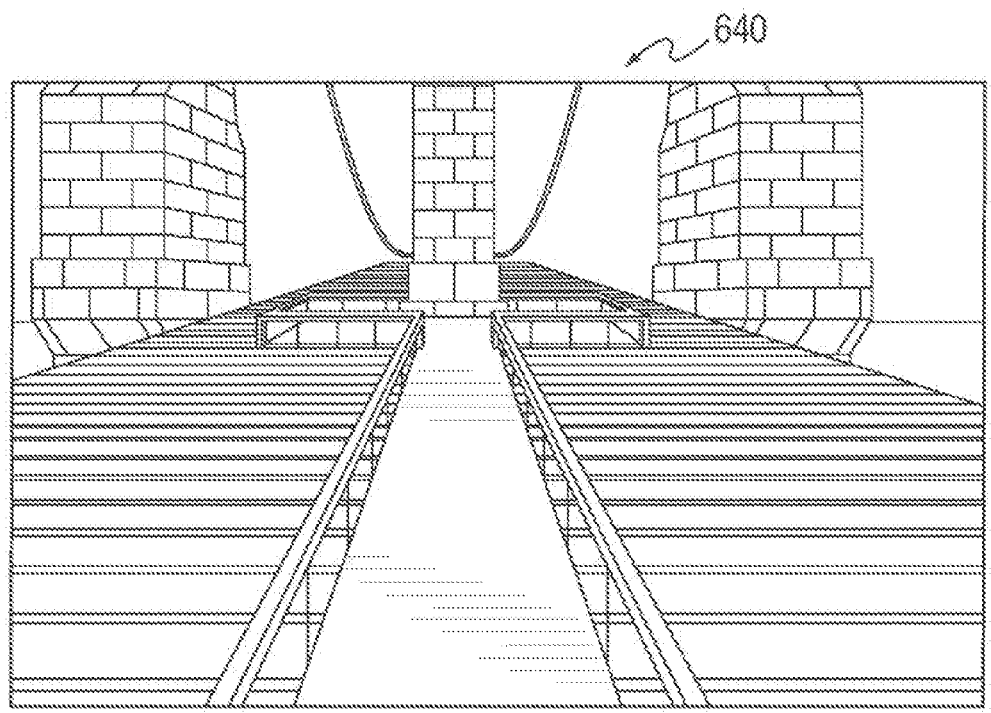
Figure 6F:
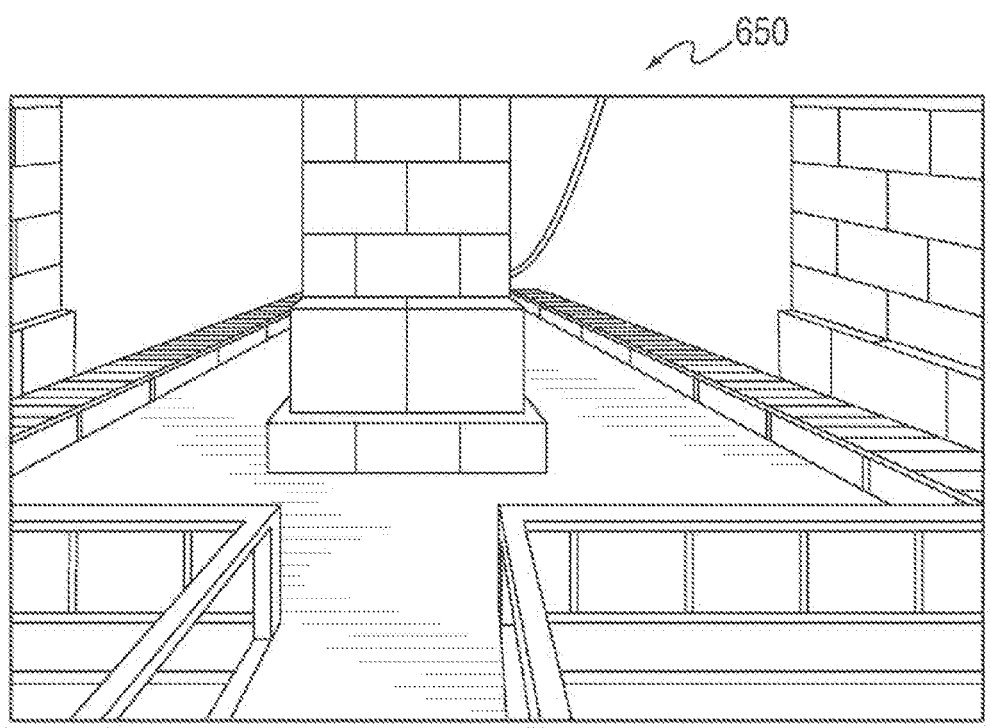
Figure 6G:
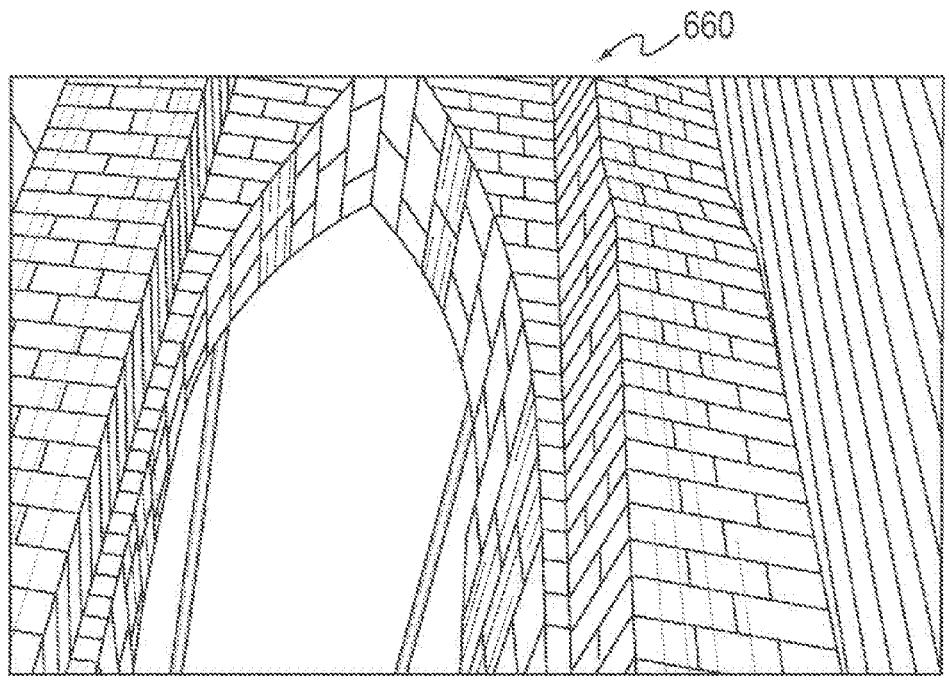
Figure 6H:
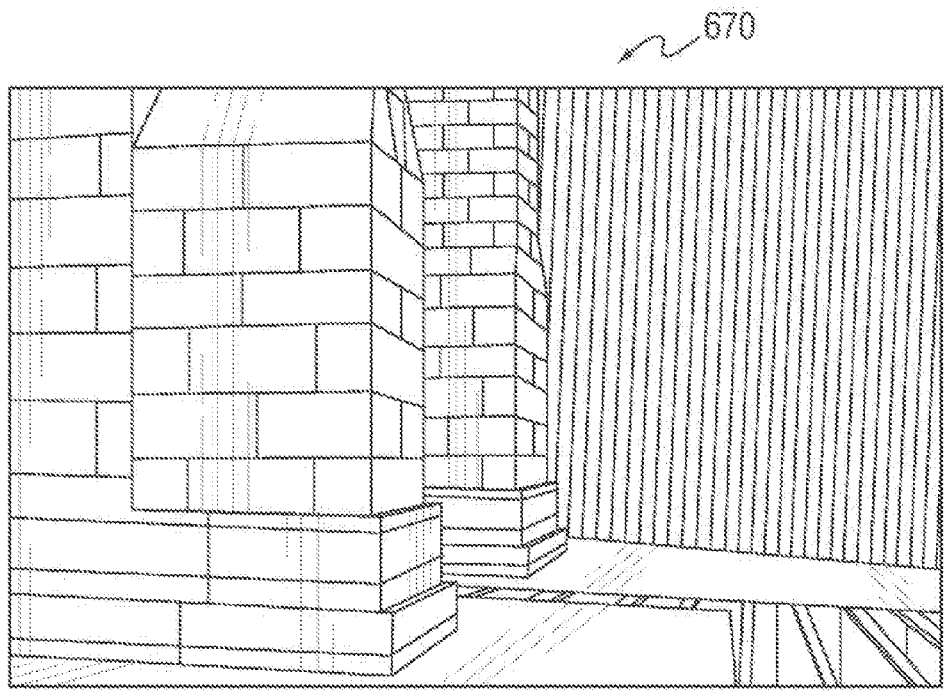

In some embodiments, the three-dimensional model can include specific initial locations or bookmarked locations from which the user can view the model with a pre-determined zoom level. For example, the model can include an initial location providing a perspective view of the entire model (e.g., as shown in FIGS. 6A-6C). As another example, the model can include an initial location on a surface of the model (e.g., on the pedestrian walkway of the bridge) from which a user can navigate within the model (e.g., walk through the model and tilt or rotate the device to view different portions of the model). Each of the initial locations can be associated with a predetermined zoom level appropriate for the initial location (e.g., low zoom for the perspective view, larger zoom for the view within the model). The electronic device can indicate the initial locations to the user using any suitable approach. For example, each location can be identified using a selectable icon displayed on the model (e.g., icon 626, selectable by touch in a touch-screen embodiment). As another example, the electronic device can display a listing of available locations from which the user can select (e.g., a pop-up window with listings displayed in response to a user request). Using the bookmarked locations, a user can quickly and efficiently navigate through a large three-dimensional model without requiring the user to physically walk through the real environment equivalent of the model (e.g., virtually walk 1825 m across the Brooklyn Bridge).

In some embodiments, the electronic device can instead or in addition provide an input mechanism for providing zoom instructions. For example, the electronic device can display a bar with a zoom slider for quickly changing the zoom of the display (e.g., zoom slider 636). As another example, the electronic device can associate particular movements of the device with zoom instructions (e.g., shake left and right to zoom up and down). In response to receiving a request to change the zoom, the electronic device can adjust the manner in which device movements are correlated with changing the three-dimensional model display (e.g., changing a correlation multiple, described in more detail below).

The electronic device can associate device movements with changes in the displayed perspective of an electronic device using any suitable approach. In particular, the electronic device can process motion and positioning information detected by the various device components (e.g., movement detection components such as a motion-sensing component, positioning circuitry, or a magnometer) using any suitable process. In some embodiments, the electronic device can define, at any suitable interval or rate, a position and orientation of the user within or around a three-dimensional model from the motion-sensing and positioning information. For example, the electronic device can define an initial position end orientation (e.g., when the user initially enables, or re-enables the deterministic motion based navigation mode) within or around the model (e.g., an initial bookmarked location and orientation). Using the motion-sensing component output, the electronic device can determine the change in position and orientation of the electronic device relative to the initial position and orientation (e.g., when the mode was first enabled, or when the display was last refreshed). For example, the electronic device can integrate acceleration data over time to determine the present velocity and position of the device. As another example, the electronic device can use the data provided by positioning circuitry to determine the user's current position. The electronic device can then apply the change in position and orientation to the model to determine a new current perspective of the model and display a rendering of the model reflecting the new current perspective. For example, the electronic device can add a position vector to the initial position in the model to change the user's location within the model, and an orientation vector to the initial orientation of the user within the model to change the user's orientation or perspective of the model from the new position. In some embodiments, the electronic device can use some or all of the output of a motion-sensing component (e.g., ignore motion along particular axes, ignore motion that is below a threshold, or use the output of only specific components).

The electronic device can correlate the processed movement information with changes in perspective in the three-dimensional model using any suitable approach. In some embodiments, the correlation can be related to the size of the electronic device display. For example, a movement of a particular amount (e.g., walking 1 m in a given direction) can be associated with displacing the model by a particular number of pixels, for example defined as a multiple of the movement amount (e.g., 100 pixels in the given direction). The correlation then may be independent of both the amount by which the model is zoomed, and specific dimensions associated with the model. In some embodiments, the correlation can instead be related to dimensions associated with the model. For example a movement in a particular direction (e.g., walking 1 m in a given direction) can be associated with moving by a multiple of the movement in the given direction (e.g., displacing the model by m times 1 m in the given direction, where the correlation multiple m is any real number). The multiple can be selected using any suitable approach, including for example a variable number changing with the zoom, based on a location or position within the model or using any other suitable approach.

To assist the user in navigating the displayed information, the correlation can be defined such that when the user returns the electronic device to a particular spatial position relative to an origin (e.g., relative to the position of the device when the movement based navigation mode is enabled), the same information is always displayed. In some embodiments, the electronic device can therefore ignore movements of the device once the device reaches an edge or limit of the three-dimensional model, but resume changing the displayed information only once the device returns to a position relative the origin that reflects the model limit. Such an approach can enhance the user's ability to use movement based navigation by providing a known physical correlation to the user's movement. Alternatively, the device can resume changing the display of information as soon as movement away from the detected limit is identified.

Figure 7:
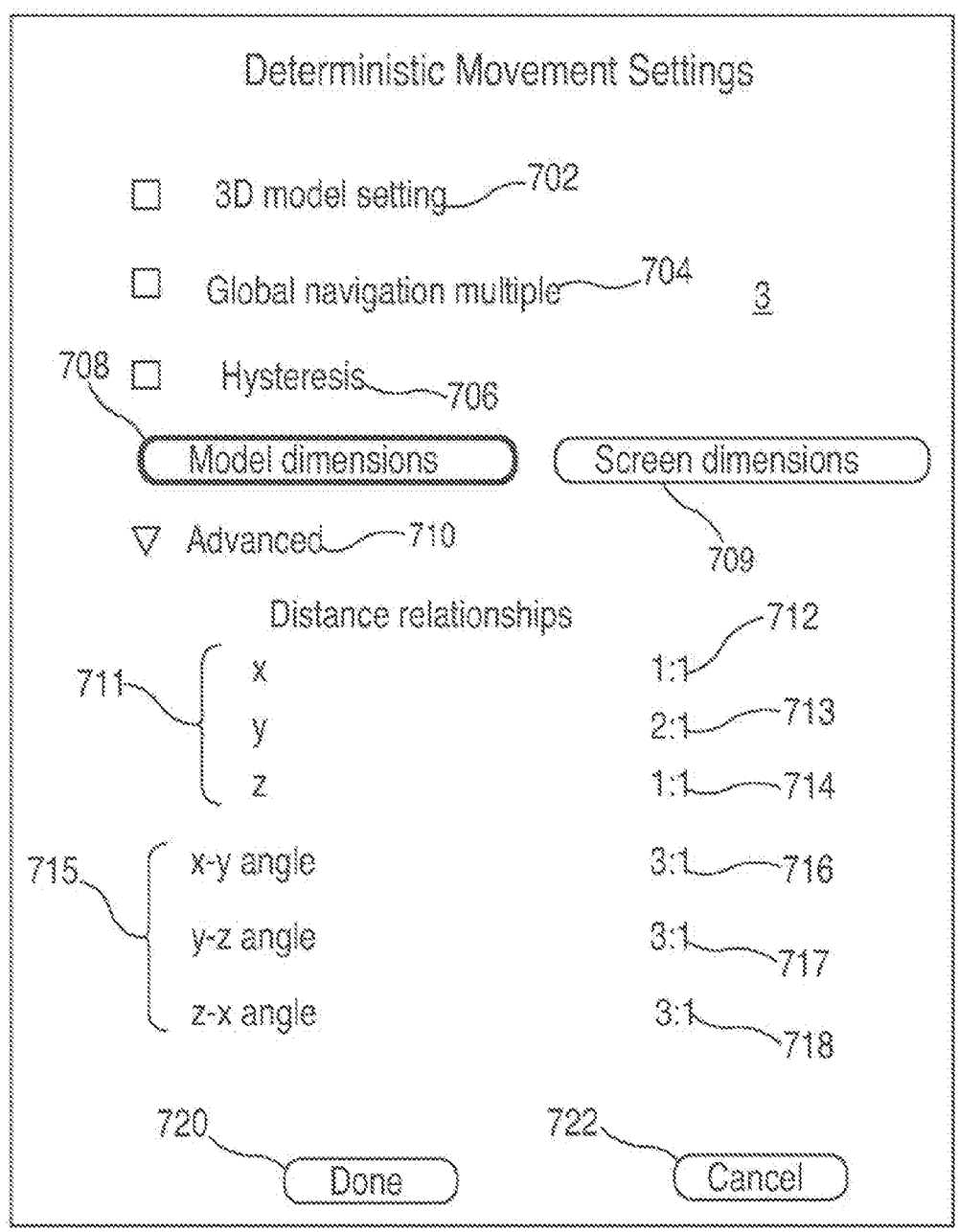
FIG. 7 is a schematic view of an illustrative display screen, for setting movement correlation parameters in accordance with one embodiment of the invention.

The particular correlation used can be set by the user, or determined from the model. In some embodiments, the electronic device can provide an interface for defining the correlations between the detected device movements and the navigation of the three-dimensional model. FIG. 7 is a schematic view of an illustrative display screen for setting movement correlation parameters in accordance with one embodiment of the invention. Display 700 can include several options for defining the movement correlation settings of the device. For example, display 700 can include correlation option 702 for changing the representation of a three-dimensional model in the manner defined by the model. As another example, display 700 can include correlation option 704 for defining a global correlation setting. For example, the user can define a correlation multiple defining how much the representation of a model will change in response to a given device movement. In addition to the correlation multiple, the user can enable or disable a hysteresis or other non-linear correlation for the movement using hysteresis option 706. For example, the initial change in the model as the device first starts to move can be small and ramp up, and the amount of displacement as the device stops moving can decrease rapidly before slowing down. The non-linear displacement at one or both of the beginning and end of the device displacement can allow the user's eyes to anticipate and better follow the displacement of the information as it occurs.

The user can define the manner in which the provided correlation multiple is used by selecting a reference dimension. For example, the user can select model dimensions option 708, for which the device movement is correlated with a corresponding distance within the model, or screen dimensions option 709, for which the device movement is correlated with a particular distance or number of pixels within the device display. In some embodiments, display 700 can include further options for associating correlation multiples with specific zoom levels.

In some embodiments, the user can instead or in addition define the correlation between different components of the device movement and the change in model representation. For example, in response to receiving a user selection of advanced option 710, display 700 can provide correlation options for linear axes 711 and rotational axes 715. The user can then define a correlation multiple or ratio of device movement to change in model perspective for x-axis option 712, y-axis option 713, z-axis option 714, and x-y angle option 716, y-z angle option 717, and z-x angle option 718. Once the user has selected the appropriate correlation mechanism, the user may select done option 720, or cancel a selection using cancel option 722.

Figures 8, 9:
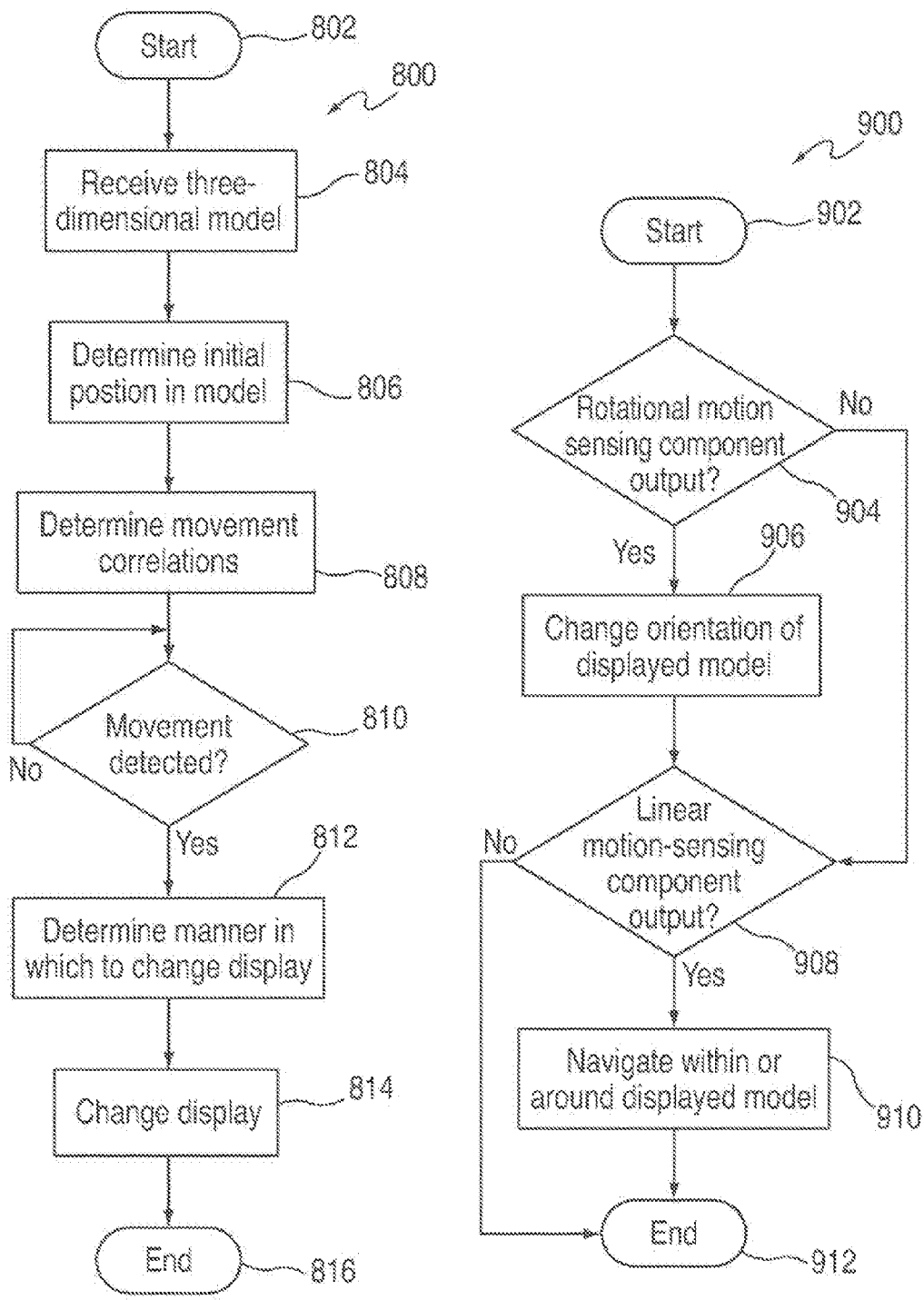
FIG. 8 is a flow chart of an illustrative process for changing the display of a three-dimensional model based on device movement in accordance with one embodiment of the invention.
FIG. 9 is a flow chart of an illustrative process for processing motion-sensing component outputs in accordance with one embodiment of the invention.

The following flow charts describe illustrative processes used to navigate a three-dimensional model using deterministic movement in accordance with one embodiment of the invention. FIG. 8 is a flow chart of an illustrative process for changing the display of a three-dimensional model based on device movement in accordance with one embodiment of the invention. Process 800 can begin at step 302. At step 804, the electronic device can receive a three-dimensional model. For example, a user can load a three-dimensional model. As another example, a user can receive a three-dimensional model from another device (e.g., receive a model by e-mail). At step 806, the electronic device can determine the user's initial position within the model. For example, the electronic device can identify an initial location and orientation bookmarked for the model. As another example, the electronic device can identify a default position and orientation (e.g., at the center of the coordinate system, aligned with the x-axis). At step 808, the electronic device can determine the manner in which electronic device movements are correlated with changes in the display of the three-dimensional model. For example, the electronic device can identify a correlation multiple for the model, and the dimensions from which the correlation is made (e.g., screen dimensions or model dimensions).

At step 810, the electronic device can determine whether movement of the device was detected. For example, the electronic device can determine whether the output of a motion-sensing component exceeds a floor. As another example, the electronic device can determine whether the output of positioning circuitry indicates a change in position. If the electronic device does not detect sufficient movement, the electronic device can return to step 810 and continue to monitor for device movement. If at step 810, the electronic device instead determines that movement was detected, process 800 can move to step 812. At step 812, the electronic device can determine the manner in which to change the displayed model. For example, the electronic device can process the motion-sensing component output to define one or more vectors indicating changes in position and in orientation of the user within or around the model. The electronic device can then apply the vectors to the user's initial position and orientation to determine the user's final position and orientation. At step 814, the electronic device can redraw the displayed model to reflect the changed position and orientation of the electronic device. Process 800 can then end at step 816.

FIG. 9 is a flow chart of an illustrative process for processing motion-sensing component outputs in accordance with one embodiment of the invention. Process 900 can be performed as part of process 800, for example during step 814 (FIG. 8). Process 900 can begin at step 902. At step 904, the electronic device can determine whether the output of the motion-sensing component include rotational components of movement. For example, the electronic device can determine whether the motion-sensing component output includes an output associated with a gyroscope or other rotational sensor. If the electronic device determines that no rotational components were included in the motion-sensing component output, process 900 can move to step 908.

If, at step 904, the electronic device instead determines that the motion-sensing component output includes rotational components, process 900 can move to step 906. At step 906, the electronic device can change the displayed three-dimensional model to reflect a new orientation of the device. For example, the electronic device can define a vector associated with the rotational components of the motion-sensing component output, and apply the vector to the initially displayed perspective of the model to determine a new perspective associated with the moved device. At step 908, the electronic device can determine whether the output of the motion-sensing component includes linear components of movement. For example, the electronic device can determine whether the motion-sensing component output included an output associated with an accelerometer or other linear sensor. If the electronic device determines that no linear components were included in the motion-sensing component output, process 900 can move to step 912 and end.

If, at step 908, the electronic device instead determines that linear components were included in the motion-sensing component output, process 900 can move to step 910. At step 910, the electronic device can navigate the user's position within or around the displayed three-dimensional model. For example, the electronic device can define a vector associated with the linear output of the motion-sensing component and change the user's position in or around the model based on the vector. In some embodiments, the changed position can be within the plane of the environment (e.g., the user is walking on the ground level of the model), or can include components out of the plane of the environment (e.g., the user's perspective moves above the ground, overlooking the environment from the sky). Process 900 can then end at step 912. Alternatively, process 900 can include a step changing the display provided to the user. It will also be understood that the distinction between rotation and linear motion-sensing component outputs is merely for illustration, and that combinations of both types of output can be associated with both changing the orientation and position of the user within or around a three-dimensional model. In addition, it will be understood that other data (e.g., positioning circuitry outputs) can be used to change the display of a three-dimensional model.

Figure 10:
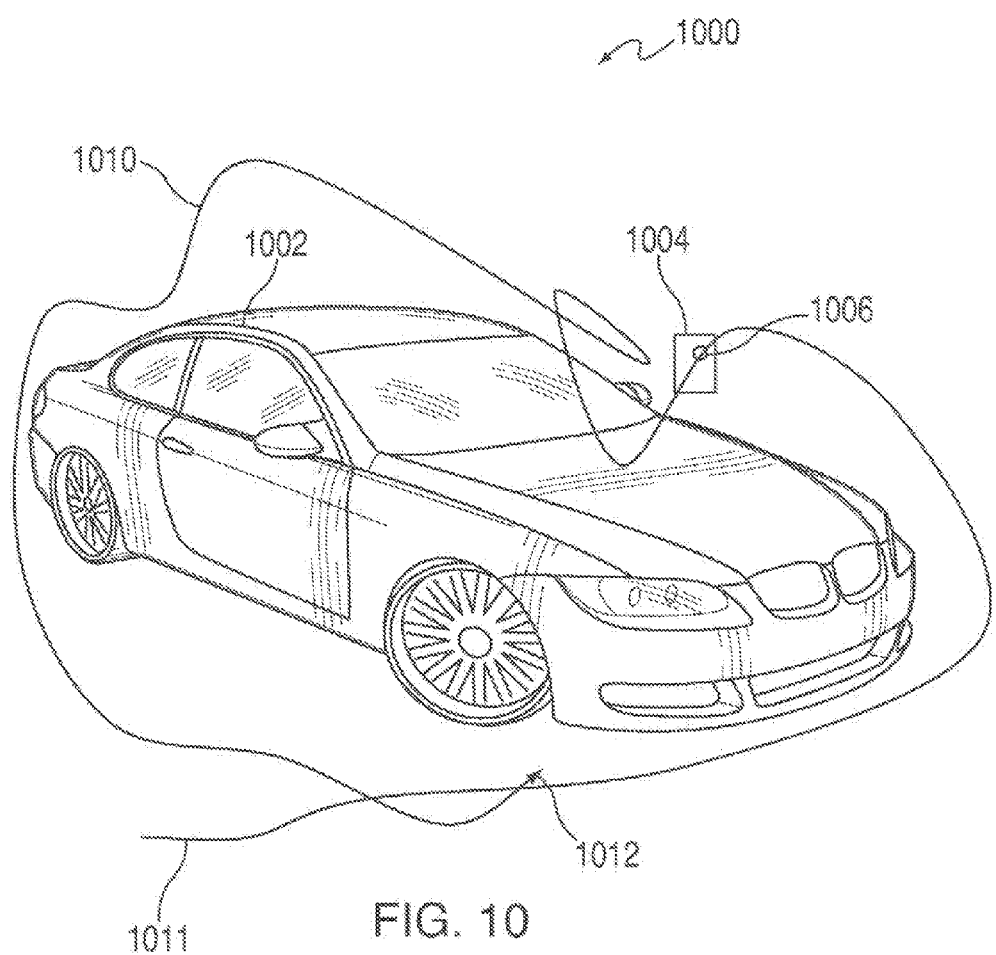
FIG. 10 is a schematic view of an electronic device moved around an object to generate information for a three-dimensional model in accordance with one embodiment of the invention.

In addition to navigating a three-dimensional model, some electronic devices can be used to generate three-dimensional models that can be viewed and navigated by other electronic devices. To do so, the electronic device may first capture the real object or environment for which a model is desired. FIG. 10 is a schematic view of an electronic device moved around an object to generate information for a three-dimensional model in accordance with one embodiment of the invention. Real (i.e., not virtual) environment 1000 can include object 1002 and electronic device 1004. To capture images of object 1002, electronic device 1004 can include camera or lens 1006 operative to detect light waves reflecting from object 1002. The electronic device can store the images recorded by lens 1006 as distinct images, or as video (e.g., defined by a sequence of video frames). In some embodiments, the electronic device can instead or in addition include additional sensors operative to detect information related to object 1002, such as a radiation emitter and receiver (e.g., for detecting the curvature or distance of different surfaces of the object from the electronic device), passive sensors (e.g., for detecting hotter or colder portions of the object), or any other suitable sensor.

To collect sufficient data to generate a three-dimensional model a user may record images of the object from different perspectives. For example, the user can enable lens 1006 (e.g., activate an appropriate recording application) and move the electronic device, and thus lens 1006, around object 1002 following an arbitrary or planned path. For example, the user can move electronic device 1004 along path 1010, starting at point 1011 and ending at tip 1012. As the user follows path 1010, the electronic device can in addition rotate or twist the device to capture different angles of object 1002. It may not be sufficient for generating a three-dimensional model however, to merely capture images of an object from different perspectives. In addition to the images, the model may require information defining the relative positioning of the images to define a three-dimensional mapping on which the images can be placed.

The electronic device can use any suitable approach to identifying spatial information to associate with each image or with video frames of a recorded video of the object. In some embodiments, the electronic device can define an initial position relative to the object from which a user can then begin taking images. Alternatively, a user can provide an indication of the position of the electronic device relative to the object as recording begins (e.g., 3 feet from the device and 3 feet from the ground). As another alternative, the electronic device can automatically determine, using appropriate sensors, its position relative to the object (e.g., using GPS, a sonar or radar type sensor, or a magnometer). The information defining the initial position of the device can then be associated with the first image or video frame captured by lens 1006. For example, the electronic device can define the position information as metadata associated with the image files. As another example, the electronic device can generate a distinct file referencing the captured images for the position information.

As the user moves the electronic device, the motion-sensing component (or other electronic device components) can provide an output describing the motion. The output at particular moments in time can then be associated with the particular images or video frames captured at the same moment in time. The electronic device can associate the movement information from the motion sensor output with the captured images using any suitable approach, including for example as a distinct file referencing particular images or video frames, as metadata associated with the images or video frames, or as data embedded in the images or video frames. If a video is recorded, movement information may not be associated with every video frame, but rather only with particular video frames at established intervals. For example, if a video is stored as a series of I, P and B-frames (e.g., using a video compression algorithm), movement information can be associated with only a subset of the I, P and B-frames (e.g., movement information can be associated only with I-frames and not with P or B frames). As another example, if video is stored as a series of I, P, and B-slices, movement information can be associated with only a subset of the I, P, and B-slices (e.g., only I and B-slices). The movement information (e.g., a vector) can define the movement of the electronic device relative to the origin, relative to the immediately prior position, relative to a prior position selected at a predetermined interval, or relative to any other discernable location.

Once the electronic device has captured a video or a series of images of the object, and has associated movement information with the images, the electronic device can process the images and movement information to generate a three-dimensional model of the object. For example, the electronic device can process the motion information to convert the description of the device movement from a device-centric coordinate system to an environment-based coordinate system and generate a three-dimensional frame depicting the environment (and object) recorded by the lens. The electronic device can then associate the recorded images with the frame to create a three-dimensional model having an environment-based coordinate system. In some embodiments, the electronic device can record an image of the same portion of the object from different angles, or at different times as the device moves along path 1010. When processing the recorded data to form the three-dimensional model, the electronic device can combine several images of a same portion to provide a more detailed perspective of an object. Alternatively, the electronic device can combine several images taken in the vicinity of a particular portion of the object (e.g., accounting for the differences in perspective) to generate an image to associate with the particular portion (e.g., if the particular portion was not directly recorded by the electronic device).

In some embodiments, the electronic device can combine several recordings of an environment to generate a more complete three-dimensional model. To properly combine the recordings, the electronic device can determine the relationship between each of the recordings. For example, the electronic device can identify the initial starting positions of each recording relative to the object and apply recorded images to the model based on the overall in the three-dimensional frames generated for each recording (e.g., where precise GPS positioning information and magnmometer orientation information is available). As another example, the electronic device can identify images or video frames from each recording that capture the same portion of the object, and map the images of each of the recordings on the three-dimensional model in a manner that reflects the overlap of the recordings. The electronic device can, in some embodiments, combine images from each of the recordings to apply to portions of the model.

The processing power required to convert a recorded video tagged with movement information to a three-dimensional model (e.g., to change coordinate systems associated with images of the recording) can, in some cases, exceed the capabilities of the electronic device. For example, if the electronic device includes a hand-held portable electronic device, the device may not have sufficient processing abilities or power supply to generate a model from the recorded information. The electronic device can then provide the recording to a host device having more substantial capabilities for processing. In some embodiments, the host device can receive recordings of an object or environment from several devices, and generate a three-dimensional model using information from each of the several recordings. The host device can then in turn provide the three-dimensional model to the electronic device for navigation (e.g., using deterministic movement).

Because the resulting three-dimensional models can be limited (e.g., not include images for every face of the model), the model can include a recommended path to follow for navigating the model. The path can be overlaid on the model images (e.g., similar to the path of FIGS. 3A-3D), or provided as icons in a corner of the display (e.g., arrows indicating available paths).

Any electronic device can be used to generate three-dimensional model of any suitable environment, or in any suitable context. For example, recordings of a sporting event by several cameras can be combined to generate three-dimensional models of plays that users can navigate (e.g., navigate around a batter hitting a ball in baseball, or around a football play to see whether the ball carrier reached a particular mark). As another example, recordings could be used to generate three-dimensional models of concerts or other public events. The electronic device could use any suitable recordings to generate the model, including for example professional recordings created by content providers, recordings performed with portable devices (e.g., cellular telephone recordings by fans), or any other recording. The electronic device could use time stamps, geotags, and content similarity to combine the recordings in a model. As still another example, a user can record a video of a house or building to show to friends (e.g., a new home) and provide a three-dimensional model of the space for others to navigate in any desired manner (e.g., without being constrained by the order in which the recording was made). In addition, recordings and three-dimensional models can be created in any other suitable context.

Figure 11:
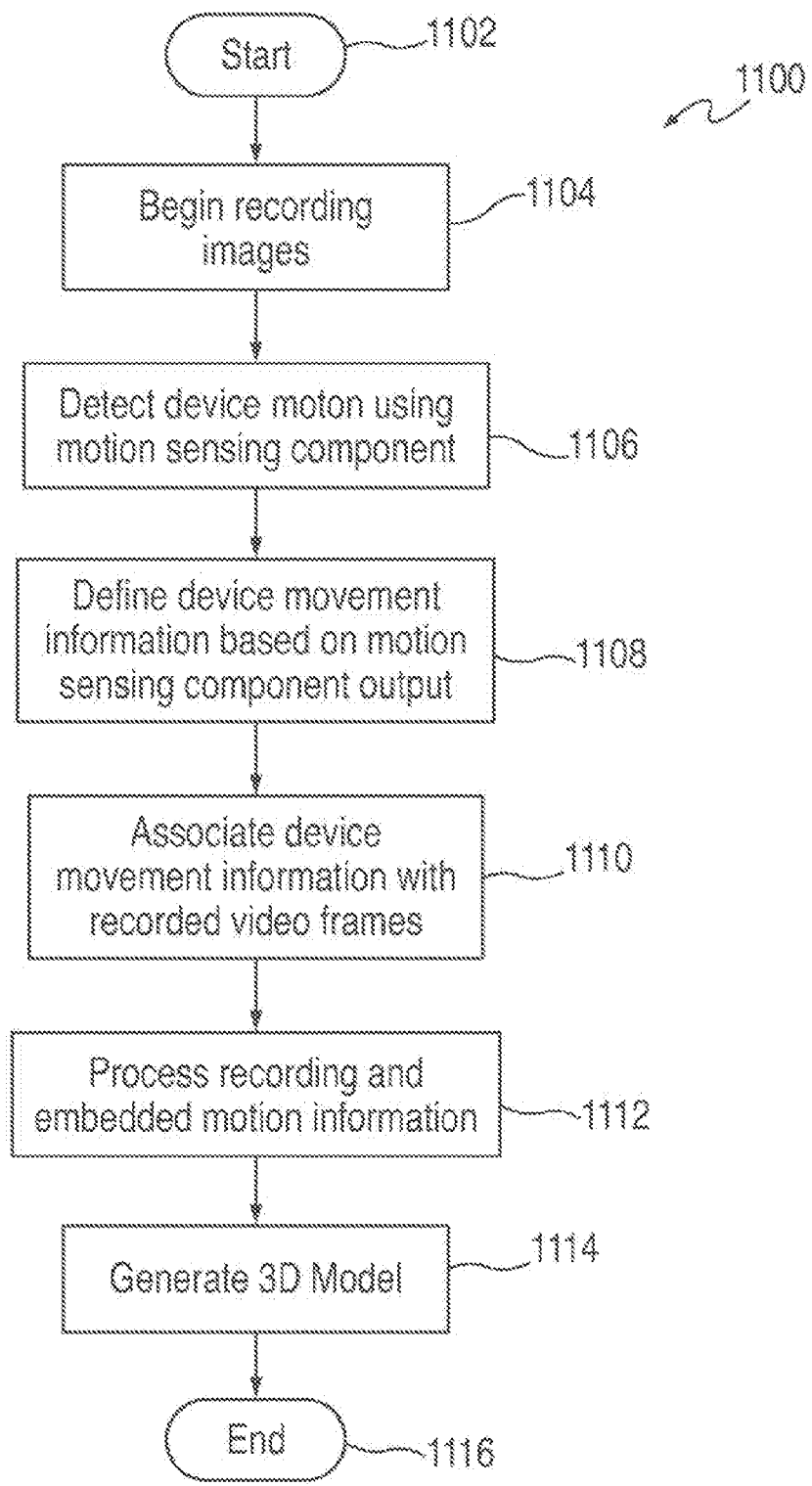
FIG. 11 is a flow chart of an illustrative process for generating a three-dimensional model from a recording in accordance with one embodiment of the invention.

The following flow chart describes an illustrative process for generating a three-dimensional model using an electronic device. FIG. 11 is a flow-chart of an illustrative process for generating a three-dimensional model from a recording in accordance with one embodiment of the invention. Process 1100 can begin at step 1102. At step 1104, the electronic device can begin recording images. For example, a user of the electronic device can direct a lens to record an environment or object in the vicinity of the user. In some embodiments, the electronic device can determine its position relative to the object or environment to record before beginning to record. For example, the electronic device can determine its absolute position and orientation using positioning circuitry and a magnometer. As another example, the electronic device can determine its position relative to an object using a appropriate sensor (e.g., an emitter and receiver providing positioning information relative to an object, for example by measuring radio waves reflected from the object).

At step 1106, the electronic device can detect its motion. For example, a motion-sensing component of the electronic device (e.g. a gyroscope or an accelerometer) can provide an output reflecting the movement of the device. As another example, positioning circuitry of the electronic device can provide an output reflecting the change in position of the device. As still another example, a magnometer or other component providing information regarding the orientation of the device can provide an output. At step 1108, the electronic device can define movement information based on the output of the electronic device components. For example, an electronic device processor can process the component outputs to define one or more vectors indicating the movement of the device relative to an initial or previous position and orientation. At step 1110, the electronic device can associate the movement information generated at a particular time with a video frame or image recorded by the electronic device lens at the same time. For example, the electronic device can embed, within video frames, movement information associated with the particular video frames (e.g., information based on the motion-sensing component output provided at the same time that the video frame was recorded). As another example, the movement information can be stored in a separate or distinct location (e.g., as part of a header or footer in the video file, or as a separate file) and linked or associated with specific video frames or images.

At step 1112, the electronic device can process the recorded images or video and the associated movement information to, at step 1114, generate a three-dimensional model of the recorded object or environment. For example, the electronic device can determine, from the initial position and movement of the electronic device, a three-dimensional representation of the device positions onto which images recorded by the device can be applied (e.g., change the coordinate system associated with the recorded images). By then providing the representation to another electronic device, the other electronic device can navigate the representation in any suitable manner, including for example by viewing images in an order other than the order set by the recording. This can in turn allow true three-dimensional navigation of the recorded object or environment.

In some embodiments, a user can use deterministic movements and other inputs as described above to navigate environments having several dimensions other than three geometrical dimensions (e.g., multi-dimensional environments). In particular, an electronic device can navigate an environment having auditory, olfactory, tactile dimensions, or other types of dimensions. For example, as a user navigates within an environment, audio provided by an audio circuitry can change to reflect the user's navigation (e.g., audio volume or pitch changes to reflect the user's distance from an audio source, or the particular audio provided can change based on the user's proximity to different audio sources). As another example, the electronic device can include a component operative to provide different smells (e.g., floral smells as the user navigates towards flowers, and automobile smells as the user navigates toward a car). As still another example, the electronic device can include a component for providing tactile feedback (e.g., a vibrating element). Using the component, the electronic device can provide tactile feedback when the user navigates to an appropriate portion of the environment (e.g., vibrate as the user reaches a boundary of the environment, or change temperature when the user moves closer to a heat source in the environment). Other types of sensors can also be used to provide feedback in other dimensions of a multi-dimensional environment.

The above described embodiments of the invention are presented for purposes of illustration and not of limitation, and the present invention is limited only by the claims which follow.

What is claimed

1. A method for displaying a three-dimensional model of an object, comprising:
    displaying a first image of a first portion of a three-dimensional model of an object using an electronic device, wherein the first image comprises a virtual view of the three-dimensional model of the object from the electronic device, the electronic device having a first virtual perspective and a first virtual location with respect to the three-dimensional model of the object;
    detecting, with the electronic device, a first movement of the electronic device;
    determining, based on the first movement, a second virtual perspective and second virtual location of the electronic device with respect to the three-dimensional model of the object, comprising:
        scaling a magnitude of the first movement, based in part on at least one of a direction of the first movement and a hysteresis or other non-linear correlation parameter; and
    displaying, using the electronic device, a second image of a second portion of the three-dimensional model of the object based, at least in part, on the determined second virtual perspective and second virtual location.

2. The method of claim 1, wherein the act of detecting comprises:
    receiving, from a movement detection component of the electronic device, an output that indicates the first movement.

3. The method of claim 1, wherein the act of displaying further comprises:
    obtaining, from a source different from the electronic device, the second image.

4. The method of claim 1, wherein the first movement comprises a movement indicating a change in a zoom level of the three-dimensional model of the object from the first image to the second image.

5. The method of claim 1, wherein the act of determining further comprises:
    determining at least one of a velocity and an acceleration of the first movement.

6. An electronic device operative to display a three-dimensional model of an object, comprising:
    a display device operative to display a plurality of portions of an object;
    a motion-sensing component operative to provide at least one output that reflects movement of the electronic device; and
    one or more processors operative to:
        display a first image of a first portion of a three-dimensional model of the object, wherein the first image comprises a virtual view of the three-dimensional model of the object from the electronic device corresponding to a first virtual perspective and a first virtual location of the electronic device with respect to the three-dimensional model of the object;
        receive output provided by the motion-sensing component, the received output corresponding to a first movement of the electronic device;
        determine, based at least in part on the first movement, a second virtual perspective and second virtual location of the electronic device with respect to the three-dimensional model of the object, comprising:
            scaling a magnitude of the first movement, based in part on at least one of a direction of the first movement and a hysteresis or other non-linear correlation parameter; and
        display a second image of a second portion of the three-dimensional model of the object corresponding, at least in part, to the second virtual perspective and the second virtual location with respect to the three-dimensional model of the object.

7. The electronic device of claim 6, wherein the one or more processors are further operative to generate the second image by:
    sending the received plurality of outputs to a host device for generating the second image; and
    receiving the second image from the host device.

8. The electronic device of claim 6, wherein the one or more processors are further operative to:
    determine at least one of a velocity and an acceleration of the first movement.

9. A non-transitory computer readable medium for displaying a three-dimensional model, comprising computer readable code recorded thereon operative to:
    generate a first image of a first portion of a three-dimensional model of an object, wherein the first image comprises a virtual view of the three-dimensional model of the object from a first viewpoint, the first viewpoint having a first virtual perspective and a first virtual location with respect to the three-dimensional model of the object;
    receive information indicative of a first movement of the first viewpoint;
    determine, based on the first movement information, a second viewpoint having a second virtual perspective and second virtual location with respect to the three-dimensional model of the object, comprising:
        scaling a magnitude of the first movement, based in part on at least one of a direction of the first movement and a hysteresis or other non-linear correlation parameter; and
    generate a second image of a second portion of the three-dimensional model of the object, wherein the second image comprises a virtual view of the three-dimensional model of the object from the second viewpoint.

10. The non-transitory computer readable medium of claim 9, further comprising computer readable code recorded thereon, operative to:
- transmit the information indicative of the first movement of the first viewpoint to a host device for generating the second image; and
- receive the second image from the host device.

11. The non-transitory computer readable medium of claim 9, wherein the first movement comprises a movement indicating a change in a zoom level of the three-dimensional model of the object from the first image to the second image.

12. The non-transitory computer readable medium of claim 9, wherein the computer readable code operative to determined a second viewpoint comprises:
- computer readable code operative to determine at least one of a velocity and an acceleration of the first movement.

* * * * *

UNITED STATES PATENT AND TRADEMARK OFFICE
CERTIFICATE OF CORRECTION

| | | |
|---|---|---|
| PATENT NO. | : 8,624,974 B2 | Page 1 of 1 |
| APPLICATION NO. | : 13/621740 | |
| DATED | : January 7, 2014 | |
| INVENTOR(S) | : Richard Tsai | |

It is certified that error appears in the above-identified patent and that said Letters Patent is hereby corrected as shown below:

In the Claims

Col. 21, Claim 12, lines 2-3, change the word "determined" to --determine--.

Signed and Sealed this
Twenty-fifth Day of February, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,624,974 B2
APPLICATION NO. : 13/621740
DATED : January 7, 2014
INVENTOR(S) : Richard Tsai Page 1 of 1

It is certified that error appears in the above-identified patent and that said Letters Patent is hereby corrected as shown below:

In the Claims

Col. 21, Claim 12, lines 13-14, change the word "determined" to --determine--.

This certificate supersedes the Certificate of Correction issued February 25, 2014.

Signed and Sealed this
Eighteenth Day of March, 2014

Michelle K. Lee
*Deputy Director of the United States Patent and Trademark Office*